United States Patent [19]

Demster

[11] Patent Number: 4,721,956

[45] Date of Patent: Jan. 26, 1988

[54] APPARATUS FOR CONVERTING KEY TOPOGRAPHY INTO ELECTRICAL SIGNALS TO EFFECT KEY EVALUATION

[76] Inventor: Stanley J. Demster, 3907 Timber Ridge Rd., Midlothian, Va. 23113

[21] Appl. No.: 872,626

[22] Filed: Jun. 9, 1986

Related U.S. Application Data

[63] Continuation of Ser. No. 531,392, Sep. 12, 1983, abandoned.

[51] Int. Cl.[4] .......... H04Q 1/00

[52] U.S. Cl. .......... 340/825.56; 340/825.31; 340/825.34; 361/172

[58] Field of Search .......... 70/382, 383, 283, 277, 70/278, DIG. 51, DIG. 71; 340/825.31, 825.56, 825.57, 825.34, 542; 361/171, 172

[56] References Cited

U.S. PATENT DOCUMENTS

| | | | |
|---|---|---|---|
| 3,500,326 | 3/1970 | Benford | 70/278 X |
| 3,797,936 | 3/1974 | Dimitriadis | 70/DIG. 51 X |
| 3,845,361 | 10/1974 | Watase et al. | 361/172 |
| 4,177,657 | 12/1979 | Aydin | 70/278 |
| 4,288,783 | 9/1981 | Chauvat et al. | 340/825.31 X |
| 4,399,673 | 8/1983 | Gotanda | 70/278 X |

*Primary Examiner*—Ulysses Weldon

*Attorney, Agent, or Firm*—Neuman, Williams, Anderson & Olson

[57] ABSTRACT

Key evaluating apparatus for receiving a key having a surface whose amplitude or height is variably coded and for sensing the coded key surface to provide a set of sample signals corresponding to a sequence of sampling points on the coded key surface. The key evaluating apparatus of this invention comprises a key follower suspended to follow the movement of the coded key surface as the key is inserted past a fixed point. A key movement responsive mechanism is responsive to the movement of the key follower for generating the set of signal samples corresponding to the sequence of sampling points of the coded key surface.

45 Claims, 10 Drawing Figures

FIG 3A
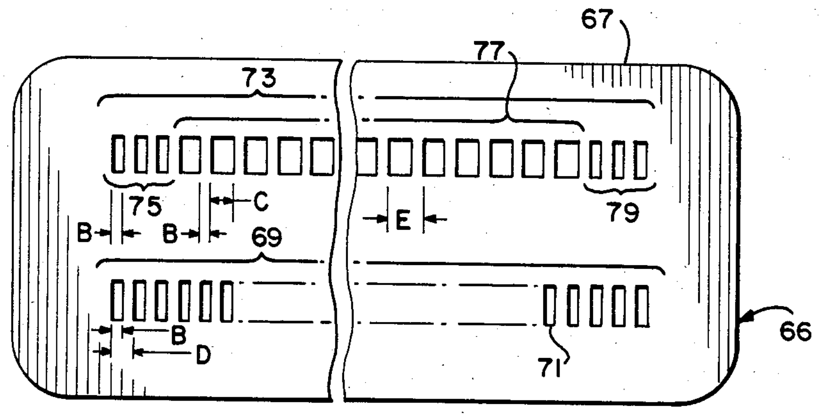
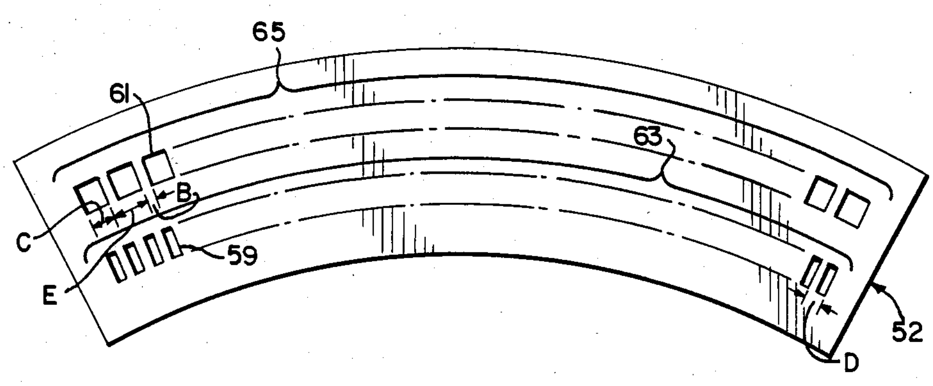
FIG 3B

APPARATUS FOR CONVERTING KEY TOPOGRAPHY INTO ELECTRICAL SIGNALS TO EFFECT KEY EVALUATION

This application is a continuation, of application Ser. No. 531,392, filed 9/12/83 now abandoned.

FIELD OF THE INVENTION

This invention relates to key evaluating apparatus responsive to being actuated by a key for releasing a locking member or striker and, in particular, to such apparatus adapted to read a unique key surface or topography and for providing digital signals indicative thereof.

DESCRIPTION OF THE PRIOR ART

The prior art, extending back to the time of the Egyptians, is replete with many diverse types of mechanical key locks. Conventional mechanical key locks have several well-known problems. First, most mechanical key locks can be "picked" or opened even without the proper key. Secondly, mechanical key locks are mechanically "programmed" to accept a corresponding, unique key. The use of a sequence of tumbler mechanisms is an example of such mechanically "programmed" lock mechanisms. To change such a "program" or code, the lock mechanism must be disassembled by a skilled individual. This reprogramming to permit use of a new key is relatively difficult and expensive. Further, a key may be encoded by configuring its key surface or topography in a moderately large number of "programs". However, the use of combinations of "master keys" is fairly limited. The use of master keys imposes severe limitations on the physical encoding of the key. Also, most mechanical key locks are not directly compatible with electronic apparatus without extensive modification.

As a result, the prior art has sought alternative structures to replace the conventional mechanical key. For example, mechanical devices have been added to conventional key mechanisms to prevent picking. For example, U.S. Pat. No. 3,889,501 of Fort discloses a combination electrical and mechanical lock system employing a fixed lock cylinder and a rotatable key slug having a key aperture therethrough for receiving a key having coded apertures. The key is inserted into the key aperture. A photo-optical system is employed to read the coded apertures in the key to provide corresponding electrical signals. If these electrical signals match with a predetermined coded pattern, a lock pin is retracted to permit rotation of the key slug. It is evident that such a mechanical and electrical lock system is complex and expensive to implement.

Alternatively, keys in the form of cards bearing magnetically sensitive strips therein have been widely adopted. However, such cards are easily erased by commonly available electromagnetic devices. Further, magnetic card readers include magnetic heads that become easily contaminated. Further, magnetic cards are cumbersome to load into reading devices and often a misread is caused by improper loading.

Optically encoded devices in the form of keys or cards are well-known in the art. For example, U.S. Pat. No. 4,142,387 of Bergkvist discloses a key member to be inserted into a lock receptacle. The key member includes a first section containing a Moire interference pattern that is brought into registration with a second screen mounted within the lock device. Light is directed through the first and second screens to produce a radiation pattern as a product of the light passing through the first and second screens. The radiation pattern is sensed by a light sensitive element scanned across the extent of the radiation pattern. U.S. Pat. No. 3,622,991 of Lehrer discloses a card-like member having a series of holes punched therein. Further, Lehrer describes a mechanism for punching the holes in his cards in accordance with a programmable code. U.S. Pat. No. 4,090,175 of Hart discloses a similar card/key member having openings encoded therein. U.S. Pat. No. 3,797,937 of Dimitriadis discloses a card member encoded in an X-Y array of light transmissive and nontransmissive areas. Light is directed through the key array to be detected by a like array of light detectors to provide a corresponding set of signals. Upon insertion of the card member, a plate having an array of light transmissive and nontransmissive portions is moved in synchronism with the insertion of the key. A similar source of radiation and array of light detectors is used to scan the plate to derive a set of signals to be compared with that set of signals as derived from the key. If a match is detected, a lock mechanism is released. U.S. Pat. No. 3,838,395 of Suttill, Jr. et al. discloses a key having a series of openings therein. The pattern of openings is sensed by directing radiation through the openings to be detected by an array of light detectors. Suttill, Jr. et al. disclose that their key may be a conventional type as would co-act with a conventional tumbler lock mechanism. The transparent areas may be formed as notches cut in the edge of the key. Alternatively, Suttill, Jr. et al. disclose that the key may be of any suitable rigid plastic or metallic material and that the key may include a transparent material such as plastic or glass that is coded with an array of transmissive and nontransmissive portions. U.S. Pat. No. 3,733,862 of Killmeyer also discloses a conventional key having a series of small holes therein or an insert having a pattern of transmissive and opaque areas disposed therein. Light is directed through the transmissive, coded areas onto a photodetector, which determines whether the projected pattern of light is valid or invalid. Optically encoded keys are subject to problems associated with accurately detecting the light pattern derived from the optically encoded key. For example, such keys may be physically damaged or may become soiled or contaminated by use or exposure to ambient conditions. Such contamination may readily affect not only the intensity, but the configuration of the derived light pattern in a manner that comparison of the light pattern to a known or preset light pattern is difficult if not impossible.

Further, keys are known that employ electronic circuits to store data that is read out by the lock mechanism and compared to a stored manifestation to determine whether the lock should be released. U.S. Pat. No. 3,732,542 of Hedin discloses a key made of an electrically insulating material having conductive segments disposed thereon in an array uniquely identifying the key. Upon the insertion of the key into a lock mechanism, contacts are disposed against the key and, if a given number of circuits are completed through the key segments, a match is recognized and the lock mechanism is opened. A more complex mechanism is disclosed in U.S. Pat. No. 4,209,782 of Donath et al. which discloses a key having a key memory cell, whereby upon insertion into a key receptacle, data within the key memory cell is read out and compared with a preset code to release a lock mechanism upon agreement or coincidence of the key code and the preset code. The lock mechanism also includes a pseudorandom code generator that is capable of reprogramming the key memory each time the key is inserted or as otherwise may be required. Keys containing such electronic circuits to store data depend upon mechanisms for reading out the data from the electronic circuits. Typically, the reader mechanisms employ small, fragile electrical contacts, which are easily damaged and are subject to contact resistance problems; in either event, read out of data from the electronic circuits has not proved reliable.

Thus, the prior art does recognize difficulties associated with mechanical locks employing cylinders or tumblers, as well as problems associated with lock mechanisms designed to function without conventional mechanical analog keys. However, the mechanical analog key, in contrast to its tumbler lock mechanism, offers many advantages, especially when compared with cards or keys encoded by optic, magnetic or electronic circuit means. First, mechanical keys are universally known and do not require an orientation or training process to familiarize potential users. Secondly, mechanical keys are rugged devices, which for all practical purposes, cannot be worn out. Mechanical keys have no electrical contacts or moving parts and are unaffected by magnetic fields or radiation. Mechanical keys can be made of any hard material such as steel, brass, aluminum, plastic or glass. Key surfaces do not require any special coatings. Further, there is no restriction of key color and moderate soiling has no effect. Mechanical keys may be encoded by well-known and universally available mechanisms. Typically, key surfaces may be configured in almost limitless combinations for unique or proprietary applications.

Further, prior art locks, whether of the conventional, mechanical key type or of alternative structures such as magnetically or optically encoded devices or electronic circuits, evaluate the coded surface of a key in a static manner. For example, a key is inserted into a typical mechanical key lock comprised of a sequence of tumblers. After the key has been fully inserted into the mechanical lock, the user attempts to rotate the key, whereby the sequence of tumblers evaluates the coded key surface, offering restraint to key rotation if there is not a match. It is understood that typical mechanical key locks statically evaluate the coded key surfaces in that the key is fully inserted and at rest when the comparison process is undertaken. Similarly, lock mechanisms employing electrical means typically comprise an array of electrical contacts for evaluating the coded key surface. In use, the key is disposed adjacent to the contact array, whereby the contact array senses statically whether there is a match between the contact array and a pattern of conductive portions or circuits born by the key. If a prescribed number of circuits through the key contact portions are completed, the lock mechanism is released. An optically implemented lock mechanism of the prior art typically employs an array of light sources and a key mechanism having a pattern of light transmissive and opaque portions. Such an optically encoded key is disposed within the lock mechanism. Light from the array of light sources is directed through the key pattern and is sensed statically by a light array of light sensitive elements such as photodiodes. If light is transmitted through the transmissive key portions onto each of the photodiodes, the resulting electrical signals provide a lock release signal. In contrast to the prior art, the key evaluating apparatus of this invention is dynamic in the sense that as the key is inserted into the key evaluating apparatus of this invention, a varying portion of its analog surface is evaluated. As will be explained below in detail, the dynamic evaluation provided by this invention permits the sequential evaluation or sampling of points on a coded analog surface of the key to provide a corresponding set of electrical signals and, in particular, digital signals.

SUMMARY OF THE INVENTION

It is therefore an object of this invention to replace mechanical cylinder or tumbler lock mechanisms in favor of new and improved apparatus for sensing a key surface(s) or topography to provide corresponding electrical signals.

More specifically, it is an object of this invention to provide new and improved key evaluating apparatus that is capable of receiving and converting the coded surfaces or topography of conventional keys into corresponding electrical signals.

It is a still further object of this invention to provide new and improved apparatus for evaluating an analog surface(s) of a coded key to provide digital signals indicative thereof.

It is a further object of this invention to provide key evaluating apparatus that is capable of receiving and reading existing, conventional keys, such as may be made by currently available key cutting devices.

It is another object of this invention to provide key evaluating apparatus that is capable of reading keys with more than one set of coded data thereon, whereby varying degrees of security may be implemented.

It is another object of this invention to provide new and improved key evaluating apparatus that is essentially impervious to wear and corrosion as would occur with the apparatus of the prior art that employ electrical contacts, magnetic coils or optically transmissive or opaque portions to encode key data.

It is a further object of this invention to provide a new and improved key evaluating apparatus, which provides no mechanical, magnetic or electrical feedback in the process of validating the topography of a key.

It is a still further object of this invention to provide a new and improved key evaluating apparatus that is physically separated from its associated locking mechanism to enhance the resistance of the apparatus of this invention from being overpowered or forced.

It is another object of this invention to provide a new and improved key evaluating apparatus capable of dynamically evaluating a coded key surface of a key as the key is being inserted into the evaluating apparatus of this invention.

It is a still further object of this invention to provide a new and improved key evaluating apparatus capable of evaluating a coded key surface that is analog in character for providing a set of digital signals corresponding to a set of sampling points taken along the coded analog surface of the key.

In accordance with these and other objects of the invention, there is disclosed key evaluating apparatus for receiving a key having a surface whose amplitude or height is variably coded and for sensing the coded key surface to provide a set of sample signals corresponding to a sequence of sampling points on the coded key surface. The key evaluating apparatus of this invention comprises a key follower for sensing dynamically the height of the coded key surface as the key is inserted within the apparatus. A key movement responsive mechanism is responsive to the movement of the key follower for generating a key set of sample signals corresponding to the sequence of sampling points of the coded key surface.

In a first embodiment of this invention, termed herein as the "X-Y" variation or embodiment, there is included a displacer mechanism that is responsive to key insertion for providing an electrical signal indicative of key insertion depth. The aforementioned key movement responsive mechanism is responsive to a change of the electrical signal for taking a sample of the key set of sample signals. The signal samples are stored in a sequence or profile in an input buffer. After the input buffer has been filled, the key set of signal samples is compared with a set of valid key codes stored within a memory, the aforementioned set including at least one valid key code. If a match is realized between the signals stored in the buffer and the memory, a key validation signal is generated to release a lock mechanism.

In a second embodiment of this invention, termed herein as the "Y" only variation or embodiment, only the key follower is required. A transducer is responsive to the incremental movement of the key follower for providing a sample signal indicative of a change of the height of the coded key surface, the sample signal to be placed into the next storage location of an input buffer. Illustratively, an incremental height increase may be represented by a "1" and a height decrease by a "0", whereby a set or profile of "0's" and "1's" is stored in the input buffer.

BRIEF DESCRIPTION OF THE DRAWINGS

A detailed description of a preferred embodiment of this invention is made in conjunction with the following drawings in which like references are used in the different Figures for illustrating the same elements:

FIGS. 3A and 3B are respectively enlarged, plan views of the displacer shutter and the key follower shutter as are incorporated within the key transducer of FIGS. 1 and 2;

DETAILED DESCRIPTION OF A PREFERRED EMBODIMENT

Figure 1:
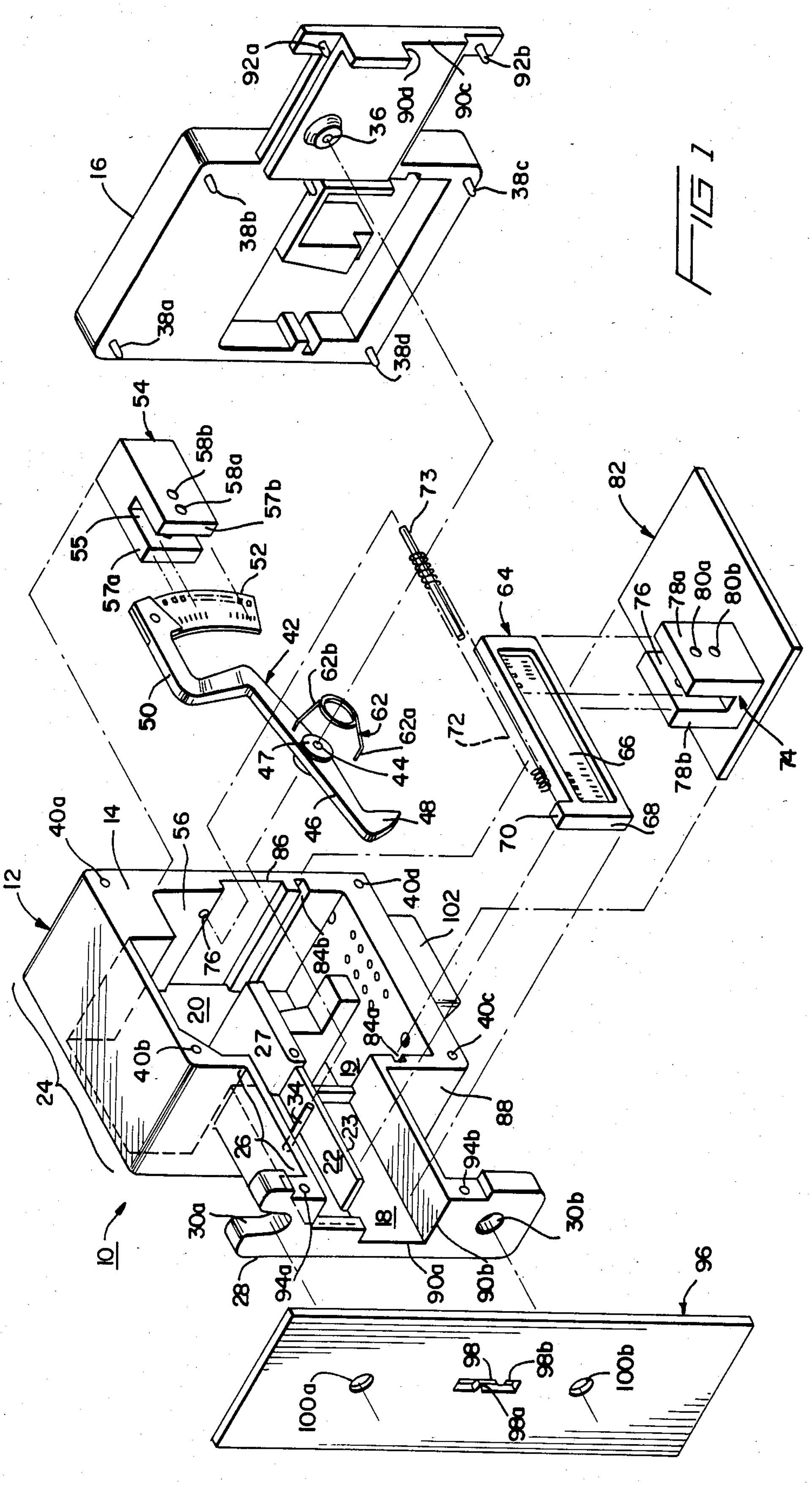
FIG. 1 is a perspective view of the key transducer in accordance with the teachings of this invention.

Referring now to the drawings and, in particular, to FIG. 1 there is shown a key transducer 10 in accordance with the teachings of this invention for receiving a conventional mechanical key and translating its surface configuration or topography into corresponding electrical signals. Significantly, the key itself has no special shape requirements. As is typical of the prior art, the key has an analog surface coded as to amplitude or magnitude. The term "analog key surface" as used in this document means a surface represented in a continuous form, as contrasted with a digitally encoded surface having discreet values or amplitudes. The key may be totally conventional in construction matching present cylinder lock keys in all respects. Thus, this invention permits the key transducer 10 to be compatible with conventional cylinder locks as now universally employed. However, the key transducer 10 of this invention is capable of reading key topographies neither presently contemplated nor compatible with convention tumbler-type lock mechanisms. For example, keys could be adapted for high security purposes to include singular or multiple planes or tracks, multiple or singular surface irregularities for mechanical encoding in a variety of aspect ratios. Conventional tumbler-type lock mechanisms are essentially low resolution reading devices in that the number of tumblers or cylinders employed dictate the number of incremental bits of data with which a key may be encoded. However, the key transducer 10 of this invention is capable of reading keys encoded with significantly greater numbers of encoded data bits, such bits being encoded on one or more surfaces of the keys. Further, the key material may be conductive or dielectric that is rigid or semirigid. Most metals, plastics, ceramics and even stiff paper will serve as a key material. Also, key surface finish and color is not generally critical.

Figure 2:
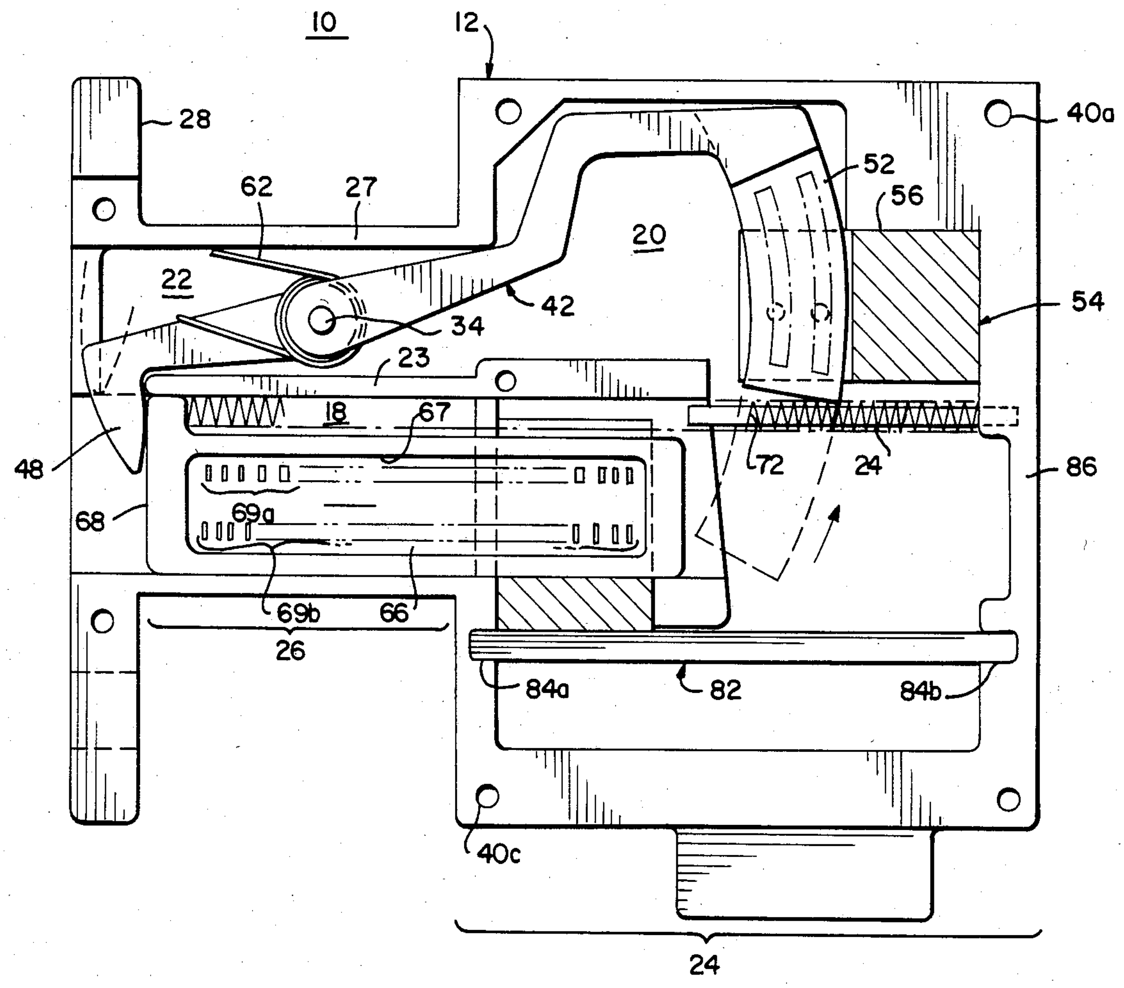
FIG. 2 is a side view of the key transducer of FIG. 1 with its cover removed.
Figure 4A:
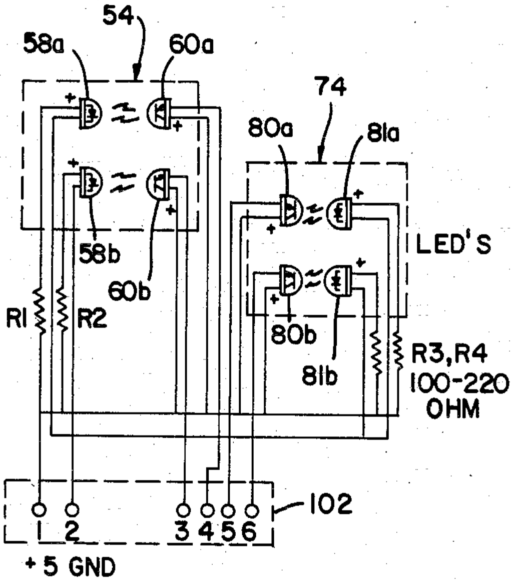
FIGS. 4A and 4B are schematic diagrams respectively of the photosensors as incorporated into the key transducer of FIGS. 1 and 2, and the architecture of the microprocessor for processing the outputs of the transducers as incorporated in the key transducer of FIGS. 1 and 2 for releasing a lock strike assembly.
Figure 4B:
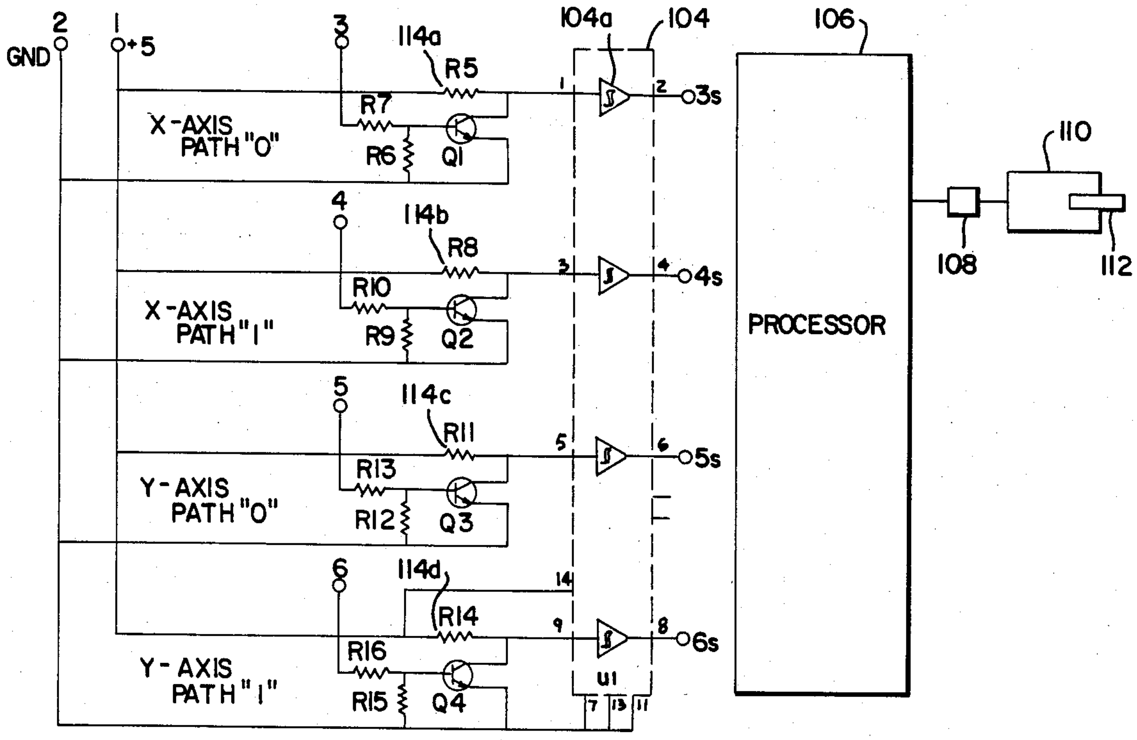

The key transducer, as illustrated in FIGS. 1 and 2, is a part of a transmitter including suitable signal processing circuitry including a microprocessor 106 and an electrically actuated lock striker assembly 110, as shown in FIG. 4B. Referring now to FIGS. 1 and 2, the structure and operation of the key transducer 10 will be explained in detail. Initially, the key to be read is inserted through a configured key slot 98 within a face plate 96, through an entrance opening 90 and into a key receiving cavity 18 of a transducer housing 12. The transducer housing 12 includes a bracket 28, in part, defining the entrance opening 90 and including a pair of openings 30_a_ and 30_b_. Though not shown, it is understood that the transducer housing 12 is designed to be disposed in a cavity formed within a door or like structure. Suitable securing means such as screws or bolts are disposed through a pair of openings 100_a_ and 100_b_ within the face plate 96 and through the corresponding openings 30_a_ and 30_b_ of the bracket 28 to be secured within the door material.

The embodiment of the key transducer 10, as shown in FIGS. 1 and 2, is adapted to provide analog output signals indicative of the key topography in the Y dimension or axis as a function of key displacement along the X axis of the key. It is understood, however, that other embodiments of this invention are contemplated including a key transducer that outputs signals only as a function of changes of key topography in its Y dimension. In the embodiment of FIG. 1, the leading end of the key, as shown in FIG. 2, abuts a leading edge of a plunger 64, which is adapted for rectilinear motion within the transducer housing 12 and, in particular, within the key receiving cavity 18 and a sensor cavity 19 thereof. The plunge 64 is spring-biased by a spring 72 mounted upon a displacer pin 73. As illustrated in FIG. 1, a retaining end of the displacer pin 73 is mounted within an opening 76 disposed within a rear wall 86 of the transducer housing 12. In operation, the leading end fo the key abuts the leading edge 68 of the plunger 64, thus, displacing the plunger to the right, as shown by the arrow of FIG. 2. The plunger 64 includes an upwardly disposed projection 70 for receiving one end of the spring 72, whereby its biasing action may be imparted to the plunger 64.

The plunger 64 also includes an optical displacer shutter 66, more fully shown in FIG. 3A. As will be explained, the displacer shutter 66 includes first and second rows 69 and 73 of slots, whereby the degree of linear displacement of the plunger 64 is accurately measured. To this end, a photosensor 74 is mounted within the sensor cavity 19. The detailed structure of the photosensor 74 will be more fully explained with respect to FIG. 4A. As shown in FIG. 1, the photosensor 74 is mounted upon a board 82 that is designed to be received within the sensor cavity 19. In particular, the edges of the board 82 are received by a pair of slots 84*a* and 84*b*. As shown in FIG. 2, when so inserted, the photosensor 74 is aligned to receive the plunger 64. Specifically, the photosnesor 74 has a pair of legs 78*a* and 78*b* forming a slot 76 therethrough for receiving the plunger 64. The leg 78*a* includes a pair of radiation sources, illustratively taking the form of light emitting diodes (LEDs) 80*a* and 80*b* that emit light beams of radiation aligned to be intercepted by the rows 73 and 69 of slots, respectively. Similarly, the leg 78*b* includes a pair of corresponding radiation sensitive devices, illustratively taking the form of photodiodes 81*a* and 81*b* that are disposed repsectively to receive the beams of radiation passing through the rows 73 and 69 of slots. It is contemplated that a microprocessor 106, as well as the associated circuitry, may be incorporated within the board 82. In such an embodiment, the board 82 illustratively takes the form of a circuit board having these components mounted thereon.

As the key is inserted to displace the plunger 64 linearly, a following stylus 48 mounted at approximately a right angle to the linear movement of the plunger 64, follows the surface configuration or topography of the inserted key. The following stylus 48 is mounted at one end of a key follower 42, whose structure and operation will now be explained in detail with respect to FIGS. 1 and 2. The key follower 42 comprises a lever 46 including an opening 44 centrally disposed therethrough, the following stylus 48 disposed at one end and a key follower shutter 52 mounted at the other end of the key follower 42. An off-set bracket 50 serves to interconnect the lever 46 and the key follower shutter 52. The lever 46 is mounted for rotational movement upon a support pin 34. The transducer housing 12 comprises a first, enlarged section 24, and a second section 26 of a restricted cross-section. One end of the support pin 34 is affixed to a side wall of the second section 26. A divider 23 is disposed within the second section 26 to separate the key receiving cavity 18 from the lever receiving cavity 22. As illustrated in FIG. 2, the support pin 34 is disposed through the opening 44 of the key follower 42 to permit rotation of the key follower 42 within the lever receiving cavity 22.

The first section 24 includes a shutter receiving cavity 20 of enlarged dimensions designed to permit the key follower shutter 52 to rotate along an arc back and forth in response to key insertion. As shown in FIG. 2, a photosensor 54 is disposed within a space 56 of the first section 24 in an aligned relationship to the movement of the key follower shutter 52. In particular, the photosensor 54 is similar in structure and operation to that of photosensor 74 and comprises a first leg 57*a* and a second leg 57*b* forming a space 55 therebetween through which the key follower shutter 52 moves. As will be described in greater detail with respect to FIG. 4A, a pair of LEDs 58*a* and 58*b* is disposed within the second arm 57*b* for directing corresponding beams of radiation across the space 55 to be intercepted by the slots of first and second rows 65 and 63, respectively of the key follower shutter 52. A corresponding pair of photodiodes 60*a* and 60*b* is mounted within the first leg 57*a* to receive the beams of light shuttered by the first and second rows 65 and 63 of slots, as shown in more detail in FIG. 3B.

A follower spring 62 is configured and disposed to impart a spring bias to the key follower 42, whereby its following stylus 48 is biased against the coded surface of an inserted key. In this manner, the following stylus 48 accurately follows the coded surface, whereby electrical signals are derived from the photodiodes 57*a* and 57*b* indicative of the encoded portions of the key surface. In particular, the follower spring 62 includes first and second ends 62*a* and 62*b*, and a coiled portion 62*c*. The key follower 42 includes a cylindrically shaped, raised portion 47 that serves to receive coiled portion 62*c*. The first end 62*a* abuts against the lower surface of an upper wall 27 of the transducer housing 12, whereas the second end 62*b* abuts against an upper surface of the lever 46 and biases the key follower 42 in a counterclockwise direction, as shown in FIG. 2.

In the illustrative embodiment as shown in FIGS. 1 and 2, the displacement or movement of the plunger 64 and the key follower 42 is sensed by optical means in the form of photosensors 74 and 54, respectively, as explained above. It is contemplated within the teachings of this invention, that sensing means employing different principles could also be employed. For example, the photosensors could be replaced by inductive means, whereby an inductive coil is disposed about or adjacent to a portion of the key follower 42 or the plunger 64. In such an embodiment, that portion of the key follower 42 or plunger 64 would be made of a magnetically permeable material. The movement of such a magnetically permeable material is inductively sensed by a coil. Thus, as such key follower or plunger moves, the inductive coupling with respect to the coil is changed. Illustratively, the inductive coil is coupled to an oscillator circuit, whereby the frequence of the oscillator output is varied dependent upon the variable coupling and, thus, the movement of the key follower or plunger. In an illustrative embodiment, the oscillator output is applied to and counted by a counter for a discreet period, whereby the count is indicative of the movements of the key follower or plunger. Similarly, optical means as employed in FIGS. 1 and 2 could be replaced by capacitive means. Illustratively, such capacitive means would include an electrode or plate disposed adjacent one or both of the key follower and/or the plunger. A portion of the key follower and/or the plunger would, in effect, comprise the other electrode or plate of the capacitive means, whereby as the key follower or plunger moves, the capacitance of such a capacitive means varies. It is contemplated that such a capacitive means would be coupled in circuit with an oscillator, the frequency of whose output varies as a function of the capacitance and, thus, the movement of the key follower or plunger.

The transducer housing 12 is associated, as shown in FIG. 1, with a cover 16. The cover 16 includes a plurality of pins 38*a*, 38*b*, 38*c* and 38*d* that are adapted to be matingly received by a corresponding plurality of openings 40*a*, 40*b*, 40*c* and 40*d* of the housing 12, whereby the cover 16 encloses the inner elements of the key transducer 10 within its transducer housing 12. The cover 16 includes an opening 36 for receiving the projecting end of the support pin 34, about which the key follower 42 rotates. Further, the cover includes a pair of pins 92*a* and 92*b* that are adapted to be matingly disposed within openings 94*a* and 94*b* of the bracket 28. When the cover 16 is so attached to the transducer housing 12, its edges 90*d* and 90*c* cooperate with the edges 90*a* and 90*b* of the barcket 28 to define the entrance opening 90, through which the key is inserted into the key transducer 10.

In an illustrative embodiment of this invention, the transducer housing 12 may be readily molded from a suitable plastic material such as a polycarbonate or a thermosetting acetal resin. The key follower 42 may be made of a suitable metal such as brass or aluminum, or of a suitable plastic such as that nylon elastomer polymer as manufactured by the DuPont Company under their trademark "DELRON". Further, each of the key follower shutter 52 and the displacer shutter 66 may be made of a relatively thin sheet of non-ferrous metal such as copper, brass or aluminum having a thickness in the order of 5-6 mils. The slots, as shown in FIGS. 3A and 3B, may be readily photoetched therein with a high degree of accuracy. Alternatively, the shutters 52 and 66 may be made of mylar film with the opaque areas photographically produced.

The displacer shutter 66 of the plunger 64 is shown in detail in FIG. 3A as comprising an encoded member 67 having a first row 73 of slots and a second row 69 of slots 71. The first and second rows 73 and 69 are disposed to intercept beams of radiation emanating from the LEDs 80*a* and 80*b*, respectively. The first row 73 of slots includes a first set of preamble slots 75, followed by a second set of encoding slots 77. Finally, considering the direction in which the displacer 64 is moved with respect to its photosensor 74, there is included a third set of three postamble slots 79. The row 69 of slots 71 are of all uniform dimension and configuration. Each of the slots 71, 75 and 79 have a common, narrow width B and a common spacing D therebetween. The slots 77 have a greater width of a dimension C with a larger spacing E therebetween. The preamble slots 75 are used as a means for initiating the process of comparing the key topography or coded key surface of an inserted key with a valid key code as stored within the memory of the microprocessor 106. As a key is inserted into the transducer housing 12, the displacer 64 is disposed to the right, as seen in FIG. 2, from its home position to which the displacer 64 is biased by the displacer spring 72. The slots of the preamble 75 are employed to identify that the plunger 64 has left its home position and that the reading of the coded key surface of the inserted key is about to begin. The preamble slots 75 would be of particular importance in an embodiment of this invention, wherein the microprocessor 106 and other electrical elements of this invention are energized by a battery. In such an embodiment, a switch (not shown) is typically employed within the transducer housing 12 for sensing key insertion, whereby the battery is coupled in circuit to energize the microprocessor 106 and other elements of the key transducer 10. In this fashion, battery life is prolonged. Typically, the key is inserted within the transducer housing 12 to first actuate such a switch and, thereafter, the preamble slots 75 are sensed and the outputs of the photosensor 74 are processed to apply an initiate signal to the microprocessor 106, whereby the microprocessor 106 is initialized as the key is being initially inserted. Normally, the initialization of the microprocessor 106 precedes the detection of the preamble slots 75. The slots of the postamble 79 provide a manifestation indicating key over travel; the microprocessor 106 is programmed to respond to such over travel manifestation to indicate that the reading of the coded key surface has been completed. It is understood that the key evaluating apparatus of this invention is fully operative to sense the coded key surface, as well as to compare and evaluate the sampled signals derived therefrom, with a valid key code, without the use of the preamble slots 75 or the postamble slots 79.

Referring now to FIG. 3B, there is shown the key follower shutter 52 as comprising the first row 65 of slots 61 and the second row 63 of slots 59 disposed upon the key follower shutter 52 in alignment with the beams of radiation as generated by the LEDs 58*a* and 58*b*. As shown in FIG. 3B, the slots 61 are of larger dimensions having a width C and being spaced from each other by a dimension E.

Referring now to FIG. 4A, there is shown the circuitry by which the elements of each of the photosensors 54 and 74 are coupled to an output connector 102. The connector 102 is illustrated, in FIG. 1, as being disposed on the bottom of the transducer housing 12 to permit interconnection between the elements incorporated within the transducer housing 12 and a remotely coupled processing circuit, as will be explained below with respect to FIG. 4B. Each of the LEDs is energized by a positive voltage, illustratively +5 volts, as applied via terminal "1" via a common conductor and a corresponding one of the resistors R1, R2, R3 and R4 to each of the LEDs 58*a*, 58*b*, 81*a* and 81*b*. Thus energized, the LEDs generate a steady beam of radiation that is clipped or shuttered by their respective shutters. As a result, bursts of radiation are directed onto the aligned photodiodes. For example, the steady state radiation generated by the LED 58*a* is shuttered by the key follower shutter 52 to direct bursts of radiation onto the aligned photodiode 60*a*. Each of the photodiodes 60*a*, 60*b*, 81*a* and 81*b* have a first terminal connected to output terminals 4, 3, 5 and 6, respectively. The other terminal of each photodiode is coupled via a common connector to the +5 voltage applied to terminal 1. In an illustrative embodiment of this invention, each of the photosensors 54 and 74 may illustratively take the form of that optical switch manufactured by TRW OPTRON under their designation number OPB 826S.

Referring now to FIG. 4B, there is shown the processing circuit that is responsive to the output signals derived from the photodiodes 60*a*, 60*b*, 81*a* and 81*b* to determine whether the coding contained within the key topography matches a digital value prestored within the memory of the microprocessor 106. If a match or correlation is found therebetween, controls signals are generated to actuate an electrically actuated lock striker assembly 110. In an illustrative embodiment of this invention, the striker assembly 110 may take the form of that assembly as manufactured by Hancet Electronic Security Company under their designation HES 1004. In particular, a voltage source applies a positive DC voltage between input terminal 1 and terminal 2, which is coupled to ground, to energize an inverter assembly 104, as well as a plurality of schmitt triggers 114*a*, 114*b*, 114*c* and 114*d*. Asshown in FIG. 4B, each schmitt trigger 114 is associated with a corresponding one of the photodiodes. For example, photodiode 60*b* is coupled via terminal 3 of the connector 102 to the schmitt trigger 114*a*. When the voltage provided by the photodiode 60*b* exceeds that voltage level established by the voltage dividing circuit comprised of resistors R7 and R6, the transistor Q1 of the schmitt trigger 114*a* is rendered conductive to thereby apply a high voltage to a corresponding section 104*a* of the inverter assembly 104. Thus, a low or zero voltage is applied to the input terminal 3S of the microprocessor 106 in response to the detection of a burst of radiation incident upon the photodiode 60*b*. In a similar fashion, the outputs of photodiodes 60*a*, 80*a* and 80*b* are respectively applied via terminals 4, 5 and 6 to the schmitt trigger circuits 114*b*, 114*c* and 114*d*. Outputs are derived from each of the schmitt trigger circuits 114*b*, 114*c* and 114*d* and applied via respectively inverter sections 104*b*, 104*c* and 104*d* to the inputs 4S, 5S and 6S of the micropocessor 106. In an illustrative embodiment of this invention, the microprocessor 106 may illustratively take the form of that CMOS processor available under the designation COP 420L. The microprocessor 106 is programmed to convert the analog signals received from the photosensor 54 associated with the key follower shutter 52 into digital signals, each digital signal corresponding to an incremental movement of the plunger 64 as indicated by the output signals derived from the photosensor 74. An illustrative embodiment of the program as stored in the microprocessor 106 is illustrated in the high level flow diagram of FIG. 5 and the low level diagram set out below in the specification. Upon detecting a comparison between a digital signal corresponding to the key topography of the inserted key and that digital manifestation stored in the memory of the microprocessor 106, an output signal is generated and applied via a driver 108 to actuate the lock striker assembly 110. Upon actuation, the assembly 110 removes its striker 112, thereby, releasing a bolted or locked door. In an illustrative embodiment of this invention, the driver 108 may take the form of that integrated circuit identified by the number 2N68.

In the embodiment of this invention, as shown in FIG. 1, two shutters namely the displacer shutter 66 and the key follower shutter 52 respectively sense the key insertion depth and the key topography. As will be explained, the photosensor 74 and, in particular, its LEDs 81*a* and 82*b* output a sequence of 2 bit signals indicative of the key insertion depth along the X axis of the key, while the photosensor 54 and, in particular, its LEDs 60*a* and 60*b* provide a sequence of 2 bit signals indicative of the amplitude of the surface of the key or the key topography for each increment of key insertion along its X direction. Samples of the key profile are taken at points defined by changes in the key insertion depth, i.e., the readings of the key topography are taken at bit transitions in the X direction. To this end, the displacer shutter 66 is encoded with its slots, as shown in FIG. 3A. The two rows 73 and 69 of slots serve to establish a 2 bit code that first identifies an initial start position, provide a sequence of 2 bit signals indicative of the sequential positions of the displacer 64 along the X direction and, finally, provide an indication of the last position. By examining FIG. 3A, it is seen that the preamble slots 75 and corresponding slots 71 will provide at least three 2 bit signals indicative of a "0,0". The encoding slots 77 are so dimensioned and spaced from each other and the corresponding slots 71 to provide the following sequence of signals:

| X = Xo Pattern | Position and Remarks |
|---|---|
| 01 | First position - load "X" accumulator with 1 |
| 10 | Second position - increment "X" |
| 11 | Third position - increment "X" |
| 01 | Fourth position - increment "Y" |
| 10 | Fifth position - increment "X" |
| 11 | Sixth position - increment "X" |
| | Last position must be "11" |

Finally, as the displacer shutter 66 is displaced past the photosensor 74, the slots 79 of the postamble are sensed along with the last three slots 71 of row 69 to provide three 2 bit signals indicative of 0,0, indicating an end position. Thus, the 2 bit signals, as derived from the rows 73 and 69 of slots, may be analyzed to determine whether the plunger 64 is moving in a forward direction corresponding to the insertion of the key or to a backward direction corresponding to the withdrawal of the key. For example, the generation of "0,1" signals following the generation of "1,1" signals indicates that the displacer 64 is being disposed in a forward direction, whereas the generation of "1,0" signals following the generation of "1,1" signals indicates that the plunger 64 is moving in a backwared direction. Similarly, the generation of "0,1" signals followed by the generation of "1,0" signals indicates the forward movement of the plunger 64, whereas the generation of "0,1" signals followed by a "1,1" indicates that the plunger 64 is moving backward. Thus, by examining two successive 2 bit signals, an accumulator, formed by memory of the microprocessor 106, may be instructed correctly whether to increment or decrement a count indicative of key insertion or movement of the plunger 64 along its X axis.

As indicated above, each 2 bit signal, as derived from the LEDs 80*a* and 80*b*, define the samples to be taken along the Y axis of the coded key configuration or topography. It is understood that the slots 77 and 71 of the rows 73 and 69, respectively, establish a regular sequence of the 2 bit signals defining not only a particular position of the displacer 64, but also defining the sampling points of the encoded key surface. However, if the displacer shutter 66 had irregularly spaced slots, the sampling points of the encoded key surface would be taken at corresponding irregular points of time, thus, causing transmitters to be unique in their reading of the same key. For example, an identical key would not produce identical bit patterns inserted into one key transducer with uniform spacing and another bit pattern with nonuniform spacing. This feature would be useful in encoding key transducers as well as keys.

Figure 5:
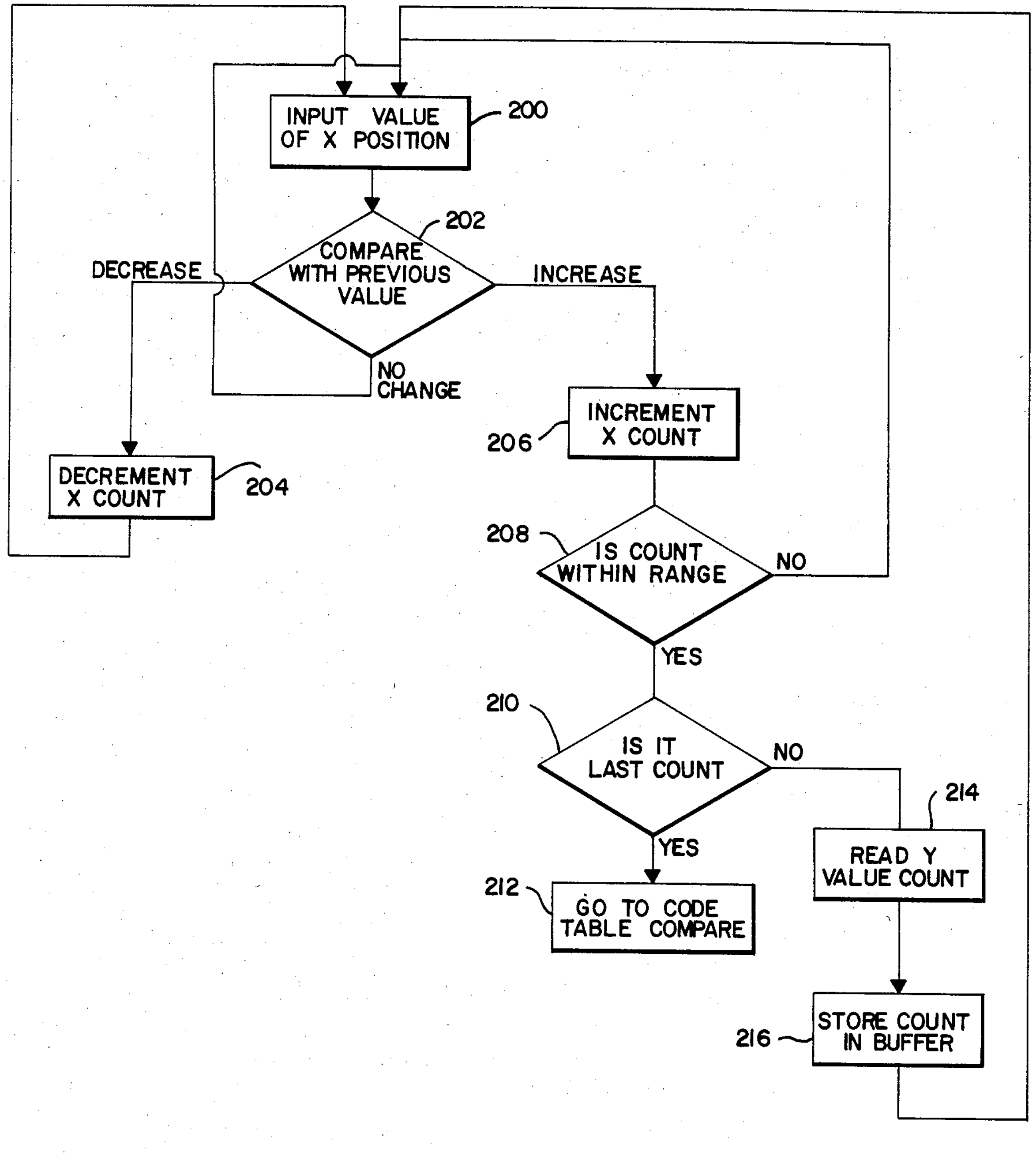
FIG. 5 is a high level flow diagram of the "X-Y" variation or embodiment of this invention as executed by the microprocessor of FIG. 4B.

Referring now to FIG. 5, there is shown a high level flow diagram of the program as executed by the microprocessor 106 of FIG. 4B for obtaining a complete set of samples or readings of the key surface, which are compared to that coded digital manifestation or set of manifestations that will effect release of the lock striker assembly 110. The embodiment of the program illustrated in FIG. 5 is termed herein as the "X-Y" variation. Initially, in step 200, a 2 bit signal indicative of the key insertion depth is applied to the microprocessor 106 via the inputs 3S and 4S. Next, in step 202, the current 2 bit signals are compared with the previous reading and a decision is made by comparing the successive pairs of 2 bit signals with each other to determine whether there is an increase or decrease, as explained above. If there is a decrease, an X count as stored in the accumulator and indicative of the key insertion depth is decremented in step 204 before returning to step 200. Conversely, if there is an increase, the X count is incremented in step 206. Next, step 208 examines the incremented or decremented count to determine whether it is within range of possible values of key insertion depth. If not, the current input of X position is disregarded and the program returns to step 200. If the key has not been fully inserted, i.e., the current X count is not equal to the maximum or last count, the program moves to step 214, which reads or samples the current amplitude of the key surface or topography. As suggested above and will be explained below in greater detail, the output signals of the photosensor 54 associated with the key follower shutter 52 provide an indication of whether the incremental insertion of the key along its X axis has produced a change of the key topography along its Y axis. A Y accumulator is formed within the microprocessor 106 for storing a count indicative of the Y amplitude, the Y count being implemented or decremented dependent upon the sensed change of key topography. Next, in step 216, the sampled value of the Y count is stored in the fixed length input buffer, having a number of count storage locations corresponding to N, i.e., the number of predetermined X increments. Step 216 accesses the accumulator Y storing the Y count and deposits the sampled Y count in the corresponding location of the buffer. As will be explained below, samples of Y counts will be stored in the buffer until the buffer has been filled.

If the current X count indicative of key insertion depth is within range, step 210 determines whether the predetermined number of Y counts corresponding to samplings of the key topography have, in fact, been read indicating that a complete set of Y counts has been obtained. If a complete set of Y counts has been obtained, step 212 compares the set of Y counts as disposed within the fixed length buffer with one or a set of acceptable key codes as contained within a code memory of the microprocessor 106. The code memory is as long as the predetermined number of readings or increments used. This code memory is a set of readings that is "N" wide, where "N" is the predetermined number of increments used, by "Q" deep, where "Q" is the number of legal key codes stored. The comparison process of the read set of Y counts stored in the buffer with the "Q" number of legal codes stored in the code memory is sequential. Each increment of the input buffer is compared with each increment in the code memory. As soon as a match fails, step 212 goes on to the next member of the array of acceptable key codes. If the array is exhausted without a match, the processor 106 provides a manifestation indicating that the inserted key does not provide the required match. If a total increment-by-increment match occurs, step 212 generates a signal via the driver 108 to release the lock striker assembly 110, whereby its striker 112 is withdrawn.

The microprocessor 106 may, in an illustrative embodiment of this invention, take the form of that processor identified by the model number Z80 as manufactured by Zilog or as that model number 80—80 as manufactured by Intel. The microprocessor 106 has an internal memory in the nature of a random access memory (RAM) that is programmed with a set of instructions to effect the above described operations, as will now be explained in greater detail. In an illustrative embodiment of this invention, the program is written in a language known as "80—80 assembly language". An illustrative example of the particular program set into the RAM of the microprocessor 106 will be set out below to effect the sequence of steps of the "X-Y" variation program, as shown in FIG. 5:

```
                        ;TITLE - SAMPLE CODE FOR MECHANICAL ANALOG KEY READER (MAKER) 26AUG1983
                        ;
                        ;       NATIONAL MICRO PRODUCTS, INC., RICHMOND, VIRGINIA 23236
                        ;
                        ;       MODE: X-Y
                        ;
0038                    INPORT  EQU     38H     ;INPUT PORT FOR KEY POSITION AND PROFILE VALUE
0039                    OUTPRT  EQU     39H     ;OUTPUT PORT FOR STRIKE CONTROL AND ALARM ACTUATION
000C                    MAXPOS  EQU     12      ;NUMBER OF INCREMENTS IN SINGLE KEY CODE
0006                    NBYTES  EQU     6       ;NUMBER OF BYTES REQUIRED TO HOLD A SINGLE KEY CODE
0003                    XMASK   EQU     3H      ;X-DIRECTION MASK (POSITION DATA FROM INPORT)
000C                    YMASK   EQU     0CH     ;Y-DIRECTION MASK (PROFILE DATA FROM INPORT)
0001                    STRIKE  EQU     1H      ;STRIKE MAST (DATA TO OUTPRT)
0002                    ALARM   EQU     2H      ;ALARM MASK (DATA TO OUTPRT)
0003                    NUMCOD  EQU     3       ;NUMBER OF LEGAL CODES
                        ;
                        ;******************************************************************
                        ;
0000'                   INIT:
0000'   AF                      XRA     A       ;INITIALIZE DATA VALUES
0001'   32 1009'                STA     XCURNT
```

```
0004'  32 100A'            STA    XLAST
0007'  32 100B'            STA    XPOS
000A'  32 100C'            STA    YCURNT
000D'  32 100D'            STA    YLAST
0010'  32 100E'            STA    YPOS
0013'  21 1000'            LXI    H,INBUF    ;INITIALIZE INPUT DATA BUFFER
0016'  06 06               MVI    B,NBYTES
0018'             INIT:
0018'  05                  DCR    B
0019'  FA 0021'            JM     INIT2
001C'  77                  MOV    M,A
001D'  23                  INX    H
001E'  C3 0018'            JMP    INIT1
0021'             INIT2:
                  ;
                  ;*************************************************************
                  ;
                  ;        THIS IS THE MAIN ROUTINE TO PROCESS KEY POSITION CODES.
                  ;
0021'             READKEY:
0021'  DB 38               IN     INPORT     ;READ CURRENT KEY POSITION AND PROFILE VALUE
0023'  47                  MOV    B,A
0024'  E6 03               ANI    XMASK      ;ISOLATE AND SAVE KEY POSITION
0026'  32 1009'            STA    XCURNT
0029'  78                  MOV    A,B
002A'  E6 0C               ANI    YMASK      ;ISOLATE AND SAVE KEY PROFILE VALUE
002C'  0F                  RRC
002D'  0F                  RRC
002E'  32 100C'            STA    YCURNT
                  ;
0031'  3A 100D'            LDA    YLAST      ;CASE - PROCESS CHANGE IN PROFILE VALUE
0034'  47                  MOV    B,A
0035'  3A 100C'            LDA    YCURNT
0038'  B7                  ORA    A
0039'  CA 005F'            JZ     START      ;CASE 1- KEY WITHDRAWN
003C'  B8                  CMP    B
003D'  CA 0069'            JZ     NOCHG            ;CASE 2- NO CHANGE
0040'  D2 004B'            JNC    INCR             ;CASE 3- PROFILE INCREASE
0043'  FE 01               CPI    1
0045'  C2 055'             JNZ    DECR             ;CASE 4- PROFILE DECREASE
0048'  C3 004B'            JMP    INCR             ;CASE 3- PROFILE INCREASE
                  ;
004B'             INCR:
004B'  3A 100E'            LDA    YPOS       ;INCREMENT ARSOLUTE VALUE OF PROFILE
004E'  3C                  INR    A
004F'  32 100E'            STA    YPOS
0052'  C3 0069'            JMP    NOCHG
                  ;
0055'             DECR:
0055'  3A 100E'            LDA    YPOS       ;DECREMENT ABSOLUTE VALUE OF PROFILE
0058'  3D                  DCR    A
0059'  32 100E'            STA    YPOS
005C'  C3 0069'            JMP    NOCHG
                  ;
005F'             START:
005F'  AF                  XRA    A          ;SETUP FOR NEXT READ SEQUENCE
```

```
0060'  32 100E'           STA    YPOS
0063'  32 100C'           STA    YCURNT
0066'  32 100D'           STA    YLAST
                  ;
0069'             NOCHG:
0069'  3A 100A'           LDA    XLAST    ;CASE- PROCESS CHANGE IN KEY POSITION
006C'  47                 MOV    B,A
006D'  3A 1009'           LDA    XCURNT
0070'  B7                 ORA    A
0071'  CA 00B2'           JZ     HOME             ;CASE 1 - KEY WITHDRAWN (HOME POSITION)
0074'  B8                 CMP    B
0075'  CA 00C5'           JZ     EXIT             ;CASE 2 - NO CHANGE IN KEY POSITION
0078'  D2 0083'           JNC    NXTPOS           ;CASE 3 - KEY BEING INSERTED
007B'  FE 01              CPI    1
007D'  C2 00A8'           JNZ    PREPOS           ;CASE 4 - KEY BEING WITHDRAWN
0080'  C3 0083'           JMP    NXTPOS           ;CASE 3 - KEY BEING INSERTED
                  ;
0083'             NXTPOS:
0083'  3A 100B'           LDA    XPOS     ;UPDATE KEY POSITION
0086'  3C                 INR    A
0087'  32 100B'           STA    XPOS
008A'  CD 0110'           CALL   CODE     ;MERGE NEW CODE VALUE IN ASSEMBLY BUFFER
008D'  3A 100B'           LDA    XPOS     ;IF KEY IS NOT FULLY INSERTED
0090'  FE 0C              CPI    MAXPOS
0092'  C2 00C5'           JNZ    EXIT             ;THEN THIS PASS IS COMPLETE, EXIT
0095'  CD 00D4'           CALL   COMPARE          ;ELSE CHECK FOR MATCH WITH STORED CODES
0098'  B7                 ORA    A                ;IF MATCH (A=0)
0099'  C2 00A2'           JNZ    ERR
009C'  CD 014A'           CALL   UNLOCK                   ;THEN RELEASE STRIKE TO OPEN DOOR
009F'  C3 00C5'           JMP    EXIT
                  ;
00A2'             ERR:
00A2'  CD 014F'           CALL   ERROR    ;PROCESS INVALID ENTRY
00A5'  C3 00C5'           JMP    EXIT
00A8'             PREPOS:
00A8'  3A 100B'           LDA    XPOS     ;DECREMENT X POSITION COUNT (KEY BEING WITHDRAWN)
00AB'  3D                 DCR    A
00AC'  32 100B'           STA    XPOS
00AF'  C3 00C5'           JMP    EXIT
                  ;
00B2'             HOME:
00B2   AF                 XRA    A        ;SETUP FOR NEXT SEQUENCE
00B3'  32 100B'           STA    XPOS
00B6'  32 1009'           STA    XCURNT
00B9'  32 100A'           STA    XLAST
00BC'  32 100E'           STA    YPOS
00BF'  32 100C'           STA    YCURNT
00C2'  32 100D'           STA    YLAST
                  ;
00C5'             EXIT:
00C5'  3A 1009'           LDA    XCURNT   ;UPDATE 'X' VALUES FOR NEXT INCREMENT
00C8'  32 100A'           STA    XLAST
00CB'  3A 100C'           LDA    YCRUNT   ;UPDATE 'Y' VALUES FOR NEXT INCREMENT
00CE'  32 100D'           STA    YLAST
00D1'  C3 0021'           JMP    READKEY  ;REPEAT PROCESS FROM START
                  ;
```

```
                    ;***********************************************************
                    ;
                    ;       THIS CODE COMPARES AN ENTERED CODE AGAINST A LIST OF LEGAL
                    ;       CODES AND RETURNS A FLAG TO INDICATE THE RESULT:
                    ;               CODE MATCH    - A=0
                    ;               NO CODE MATCH - A=FF
                    ;
00D4'               COMPARE:
00D4'  21 1000'             LXI     H,INBUF    ;SETUP POINTERS/COUNTERS
00D7'  22 1006'             SHLD    SRCPTR
00DA'  21 0154'             LXI     H,CODTBL
00DD'  06 03                MVI     B,NUMCOD
00DF'               SCRCH1:
00DF'  05                   DCR     B          ;IF COMPLETE
00E0'  FA 010D'             JM      SRCH5               ;THEN EXIT, NO MATCH
00E3'  AF                   XRA     A                   ;ELSE CHECK NEXT POSITION
00E4'  32 1008'             STA     CMPFLG
00E7'  0E 06                MVI     C,NBYTES
00E9'  EB                   XCHG
00EA'  2A 1006'             LHLD    SRCPTR
00ED'  EB                   XCHG
00EE'               SRCH2:
00EE'  0D                   DCR     C          ;IF THIS POSITION CHECKED
00EF'  FA 0101'             JM      SRCH4               ;THEN SETUP FOR NEXT
00F2'  1A                   LDAX    D                   ;ELSE CHECK NEXT CHAR
00F3'  BE                   CMP     M
00F4'  CA 00FC'             JZ      SRCH3               ;IF NOT MATCH
00F7'  3E 01                MVI     A,1                         ;THEN SET COMPARE FLAG
00F9'  32 1008'             STA     CMPFLG
00FC'               SRCH3:
00FC'  23                   INX     H                           ;ELSE KEEP GOING
00FD'  13                   INX     D
00FE'  C3 00EE'             JMP     SRCH2
0101'               SRCH4:
0101'  3A 1008'             LDA     CMPFLG     ;IF NO COMPARE ON THIS PASS
0104'  FF 01                CPI     1
0106'  CA 00DF              JZ      SRCH1               ;THEN DO ANOTHER PASS
0109'  AF                   XRA     A                   ;ELSE SET A=FOUND
010A'  C3 010F'             JMP     SRCH6
010D'               SRCH5:
010D'  3E FF                MVI     A,0FFH     ;SET A=NOT FOUND
010F'               SRCH6:
010F'  C9                   RET
                    ;
                    ;***********************************************************
                    ;
                    ;       THIS CODE MERGES A VALUE INTO THE INPUT CODE BUFFER.
                    ;
0110'               CODE:
0110'  3A 100B'             LDA     XPOS       ;CALCULATE OFFSET
0113'  CD 0131'             CALL    DIVIDE
0116'  59                   MOV     E,C
0117'  16 00                MVI     D,0
0119'  21 1000'             LXI     N,INBUF
011C'  19                   DAD     D                   ;WORD OFFSET IN HL
011D'  B7                   ORA     A          ;IF REMAINDER IS ZERO
011E'  C2 012B'             JNZ     CODE1
```

```
0121'  3A 100E'           LDA    YPOS          ;THEN ADJUST POSITION TO UPPER NIBBLE
0124'  0F                 RRC
0125'  0F                 RRC
0126'  0F                 RRC
0127'  0F                 RRC
0128'  C3 012E'           JMP    CODE2
012B'            CODE1:
012B'  3A 100E'           LDA    YPOS          ;ELSE LEAVE AS IS
012E'            CODE2:
012E'  B6                 ORA    M      ;MERGE INTO BUFFER VALUE
012F'  77                 MOV    M,A
0130'  C9                 RET
                 ;
                 ;**************************************************************
                 ;
                 ; UNSIGNED DIVIDE 4-BIT
                 ;     INPUTS:   A(INTEGER)
                 ;     OUTPUTS:  B(UNITS),C(TWO'S)
                 ;
0131'            DIVIDE:
0131'  0E 00              MVI    C,0    ;INIT TWO'S VALUE
0133'  06 06              MVI    B,6    ;INIT LOOP COUNTER
0135'            DIV10:
0135'  05                 DCR    B      ;IF LOOP COUNT EXPIRED
0136'  FA 0146'           JM     DIV20         ;THEN CLEAR VALUE (TOO BIG)
0139'  FE 02              CPI    2             ;ELSE IF VALUE NOW <2
013B'  DA 0148'           JC     DIV30         ;THEN DONE
013E'  0C                 INR    C                    ;ELSE UPDATE EIGHT'S
013F'  37                 STC
0140'  3F                 CMC
0141'  DF 02              SBI    2             ;...AND REDUCE BY 2 MORE
0143'  C3 0135'           JMP    DIV10
0146'            DIV20:
0146'  AF                 XRA    A      ;ERROR RETURN
0147'  4F                 MOV    C,A
0148'            DIV30:
0148'  47                 MOV    B,A    ;MOVE REMAINDER (UNITS)
0149'  C9                 RET
                 ;
                 ;**************************************************************
                 ;
                 ;        THIS  CODE UNLOCKS THE STRIKE
                 ;
014A'            UNLOCK:
014A'  3E 01              MVI    A,STRIKE      ;ACTIVATE THE STRIKE
014C'  D3 39              OUT    OUTPRT
014E'  C9                 RET
                 ;
                 ;**************************************************************
                 ;
                 ;        THIS CODE ACTIVATES AN ALARM
                 ;
014F'            ERROR:
014F'  3E 02              MVI    A,ALARM  ;ACTIVATE EXTERNAL ALARM
0151'  D3 39              OUT    OUTPRT
0153'  C9                 RET.
                 ;
```

```
                  ;************************************************************
                  ;
0154'  44 A5 4E 4D CODTBL:  DB      44H,0A5H,4EH,0ADH,0A9H,4CH ;LEGAL CODES TABLE
0158'  A9 4C
015A'  52 4F B7 B7          DR      52H,4FH,0B7H,0B7H,0AFH,57H
015E'  AF 57
0160   49 54 A7 AC          DB      49H,54H,0A7H,0ACH,45H,0B2H
0164'  45 B2
                  ;
                  ;************************************************************
                  ;
                            ORG     1000H                    ;RAM COMMON AREA
1000'             INBUF     EQU     $                        ;CODE INPUT ASSEMBLY BUFFER
1006'             SRCPTR    EQU     INBUF+NBYTES             ;SEARCH ROUTINE POINTER
1008'             CMPFLG    EQU     SRCPTR+2                 ;SEARCH ROUTINE COMPARE FLAG
1009'             XCURNT    EQU     CMPFLG+1                 ;CURRENT VALUE OF 'X' (KEY POSITION CHANGE)
100A'             XLAST     EQU     XCURNT+1                 ;LAST VALUE OF 'X'
100B'             XPOS      EQU     XLAST+1                  ;CURRENT ABSOLUTE VALUE OF 'X'
100C'             YCURNT    EQU     XPOS+1                   ;CURRENT VALUE OF 'Y' (KEY PROFILE CHANGE)
100D'             YLAST     EQU     YCURNT+1                 ;LAST VALUE OF 'Y'
100E'             YPOS      EQU     YLAST+1                  ;CURRENT ABSOLUTE VALUE OF 'Y'
                  ;
                            END

Symbols:
ALARM  0002    CMPFLG 1008'   CODE   0110'   CODE1  012B'
CODE2  012E'   CODTBL 0154'   COMPAR 00D4'   DECR   0055'
DIV10  0135'   DIV20  0146'   DIV30  0148'   DIVIDE 0131'
ERR    00A2'   ERROR  014F'   EXIT   00C5'   HOME   00B2'
INBUF  1000'   INCR   004B'   INIT   0000'   INIT1  0018'
INIT2  0021'   INPORT 0038    MAXPOS 000C    NBYTES 0006
NOCHG  0069'   NUMCOD 0003    NXTPOS 0083'   OUTPRT 0039
PREPOS 00A8'   READKE 0021'   SRCH1  00DF'   SRCH2  00EE'
SRCH3  00FC'   SRCH4  0101'   SRCH5  010D'   SRCH6  010F'
SRCPTR 1006'   START  005F'   STRIKE 0001    UNLOCK 014A'
XCURNT 1009'   XLAST  100A'   XMASK  0003    XPOS   100B'
YCURNT 100C'   YLAST  100D'   YMASK  000C    YPOS   100E'

No Fatal error(s)
```

A brief description of the "X-Y" variation program will be provided identifying, particularly, the program instructions by the four digit line number appearing at the right hand side of the program as provided above. At lines 0038 to 0003, definitions of the particular neumonics used throughout the program are provided. For example, the predetermined number of increments in the X direction is termed MAXPOS and is preset, illustratively, at 12. Next, in steps 0000–0021, the storage locations within the memory and registers of the microprocessor 106 are initialized or set to zero. In particular, the 2 bit signals indicative of the sampling of the key insertion depth along the axis X, as derived from the photosensor 74 (X CURNT), the previous 2 bit signal indicative of the key insertion depth (XLAST), the current 2 digit signal indicative of the amplitude sample of the key surface along the Y axis as derived from the photosensor 54 (Y CURNT) and the previously sampled 2 bit signal indicative of the Y measurement (Y LAST) are initialized to zero. Likewise, the X count as incremented and/or decremented in an accumulator (XPOS) and the Y count as stored within a corresponding accumulator (YPOS) of the microprocessor memory are also set to zero. Further, that fixed length input buffer for storing the set of X counts is termed INBUF and is also set to all zeros.

After initialization, the samples of the 2 bit signals from the photosensors 54 and 74 are obtained by the instructions of lines 0021 to 0039 comprising the subroutine identified in the above program as READKEY. First, in the instruction of line 0021, the input ports 3S and 4S of the microprocessor 106 are accessed. The instruction at line 0026 stores the accessed 2 bit signal of XCURNT at an operating register A, as formed within the memory of the microprocessor 106. Beginning with the instruction at line 002E, the values of YCURNT and YLAST are stored in the operating registers A and B and in the instruction at line 00C3, the values of YLAST and YCURNT are compared. If the instruction at line 003D determines that there is no change, the program moves to that subroutine NOCHG at lines 0069 to 0080. If the instruction at line 0040 determines that the value of YCURNT is greater than the value of YLAST, then the program moves to the subroutine INCR at lines 004B to 0052. On the other hand, if YLAST is greater than YCURNT, the instruction at line 0045 moves the program to the subroutine DECR at lines 0055 to 005C. The instructions at lines 0038 and 0039 determine whether the value of YCURNT is zero, indicating that the key has been withdrawn and, in such case, the program moves to the subroutine START at lines 005F to 0066.

The program moves to the subroutine INCR to increment the Y count stored in the accumulator YPOS. In particular, the subroutine INCR moves the Y count from its accumulator YPOS to the operating register A, increments the Y count by 1, then returns the incremented value to the accumulator YPOS, before jumping to the subroutine NOCHG. On the other hand, if the value of the Y count is to be decremented, the subroutine DECR decrements the value of Y counts stored in YPOS by 1 before exiting to the subroutine NOCHG.

In the case that the key has been withdrawn, the program moves to the subroutine START, where the values stored in the locations YPOS, YCURNT and YLAST are set to zero before moving to the subroutine NOCHG. The READKEY, INCR, DECR and START subroutines correspond to step 214 which processes the 2 bit signal output of the photosensor 54 associated with the key follower 42.

The subroutine NOCHG essentially determines whether there has been a change in key position. In steps 006D and 0070, the most recent sampling of the 2 bit signal derived from the photosensor 74, associated with the plunger 64, is examined. If zero, there is an indication that the plunger 64 is at its home position and the program jumps to the HOME subroutine at lines 00AF to 00BF. At lines 0074 and 0075, the values of XCURNT and XLAST are compared and, if equal, indicating that there has been no change in key position, the program jumps to the subroutine EXIT at lines 00C2 to 00CE. The instruction at line 0078 determines that XCURNT is greater than XLAST, indicating that the key is being inserted and the program moves to the subroutine NXTPOS. The next instruction at line 007D determines that XLAST is not of the value of "1", indicating that the key is being withdrawn and jumps to the subroutine EXIT. The comparisons at lines 0078 and 007D are not conclusive tests as to the movement of the key in that the 2 bit signal has three possible values, as indicated above. Thus, at line 0080, the instruction determines that XCURNT is a "1", i.e., the value of X count has increased, before moving to the subroutine NXTPOS. The subroutine NOCHG affects the steps 200 and 202, as shown in FIG. 5, to determine the X position of the key and to determine whether it has changed or not.

If the value of X count is to be incremented corresponding to the insertion of a key, the program moves to the subroutine NXTPOS at lines 0083 to 009C. The instructions at lines 0083 to 0087 implement step 206 moving the X count from its storage location XPOS to the operating register A to be incremented before returning the incremented value to the register XPOS. The instruction at line 008A implements step 216 to load the next value of the Y count into the buffer INBUF in response to the incrementing of the X count. Each value of the Y count is stored in a buffer location indexed in the dependent upon the value of the X count. In this fashion, a succession of Y counts are loaded into the buffer INBUF for each incremental insertion of the key into the key transducer 10. Next, the instructions at lines 008D and 0090 compare the value of the X count, as obtained from its accumulator XPOS, with the maximum number of increments along the X axis (MAXPOS), i.e., 12. If the key has been fully inserted, i.e., the X count equals the value of MAXPOS, the program moves to the subroutine COMPARE. The instructions at line 008D and 0090 implement the step 210. The COMPARE subroutine will be explained below in greater detail. If a match is made indicating that a key with one of the valid codes is inserted, the COMPARE subroutine stores a zero in the register A and, if a match is not made, a non-zero value is stored. The instruction at line 0096 examines the value stored in the register A and, if not a zero, moves to the subroutine ERR at lines 009F and 0082, which generate an error signal indicating that an invalid key has been inserted into the key transducer 10. If a zero is stored in the register A, the instruction at line 0099 generates, at an output port of the microprocessor 10, a release strike signal that is applied to actuate the striker assembly 110.

If the key is being withdrawn, the program moves to the subroutine PREPOS set out at lines 00A5 to 00AC. The subroutine implements step 204 of FIG. 5. The X count is loaded into the operating register A, decremented by 1 before the decremented value of the X count is returned to the XPOS accumulator. Thereafter, the program jumps to the EXIT subroutine.

If the key has been withdrawn and the plunger 64 is at its home position, the output signal of the transducer 74 is at 0,0 as detected by the instruction of line 0071. In that case, the program moves to the HOME subroutine. The HOME subroutine clears the XPOS, XCURNT, XLAST, XPOS, YCURNT and YLAST registers before moving to the EXIT subroutine.

The EXIT subroutine at lines 00C2 to 00CE loads the 2 digit output signals corresponding to the last sampling of the transducers 54 and 74, respectively, in the XLAST and YLAST registers, before effecting a return to the initialization subroutine beginning at line 0000.

The subroutine COMPARE set out at lines 00CF to 010A affects a sequential comparison of the set of X counts as disposed in the buffer INBUF with each of the legal codes or manifestations as stored in the code memory or table of the microprocessor 106. The subroutine COMPARE compares each incremental Y count of the buffer INBUF with each increment in the code memory. The subroutine COMPARE generates and stores a zero in the operating register A if a match is made, indicating that a valid key has been inserted, and a non-zero value FF if no match is made, indicating that an invalid key has been disposed within the key transducer 10. The COMPARE subroutine affects step 212 of FIG. 5. Initially, in step 00CF and 00D2, a pointer to the buffer INBUF for receiving the set of X counts is obtained and is saved in a storage location SRCPTR. Similarly, in step 00D5, a pointer is established in a register H facilitating addressing the code memory storing the three valid values of the coded manifestation. By the instruction of line 00D8, the B register is set as a counter for counting the total number of comparisons corresponding to the number of Y counts in the three valid coded manifestations. Initially, the count in the B register is decremented by the instruction of line 00DA and is examined by the instruction of line 00DB to determine if positive, indicating that an increment-by-increment comparison between the values stored in the buffer INBUF and the coded memory has been completed. After establishing the pointer registers, the routine COMPARE moves to the subroutine SRCH1, wherein the instruction of line 00DA decrements by "1" that count indicative of the number of comparisons to be made as stored in the register B and determines if the search of the valid key codes or manifestations as stored within the code memory has been completed. The instruction of line 00DB determines whether the count within the B register is negative indicating that a comparison with each of the valid codes has been completed without a match; if no match has been made, the routine moves to the subroutine SRCH5. If the value in the B register is positive indicating that the comparison process is not yet complete, the subroutine SRCH1 moves to its next step which stores a zero in the CMPFLG register, before setting a number equal to the number of bytes in the buffer INBUF into a register or counter C. The pointer to the code table is moved to the D and E registers and the pointer to the buffer INBUF, as stored in the SRCPTR register, is updated or incremented.

The COMPARE routine now moves to the SRCH2 subroutine, whereby the first byte in the code table is compared with the first byte of the Y counts (corresponding to the amplitude of the coded key surface) as stored in the buffer INBUF. In particular, the pointer in the register C is decremented and is tested to determine that it is not negative, indicating a completed search. After loading the next character or nibble of the Y count into the operating register A, that nibble is compared with the corresponding nibble of a valid key code as stored within the code memory. The instruction at line 00EF determines whether a match is made and, if a match is made, the routine moves to the SRCH3 subroutine. If a match is not made, a value of "1" is placed in the CMPFLG register. The SRCH3 subroutine updates the pointer to take a look at the next nibble of a byte as stored within the buffer INBUF.

After the comparison of a complete byte of data as stored within the buffer INBUF with the corresponding byte of the valid key code within the code memory has been completed, the COMPARE routine moves to the subroutine SRCH4, wherein the instruction line 00FC examines the values stored within the CMPFLG register. If a "1" is stored in the CMPFLG register, the COMPARE routine returns to the SRCH1 subroutine. If a zero is stored, indicating that a match has been made, the COMPARE routine moves to the SRCH6 subroutine which effects a return to line 0092 of the NXTPOS subroutine of the main program.

The remaining subroutines, namely the CODE subroutine and the DIVIDE subroutine, are in the nature of housekeeping operations. In particular, the CODE subroutine loads the current value stored in the XPOS register as indicative of the key insertion depth into the operating register A. After determining that each nibble of the Y count is present, the value of YPOS is obtained and loaded into the buffer INBUF in an index position according to the value of XPOS. The DIVIDE subroutine keeps track of the nibbles of each 4 bit signal as used in the above program.

The key transducer 10 of FIG. 1 comprises two transducers or photosensors 54 and 74 to provide electrical signals indicative respectively of the height or amplitude of the coded key surface along its Y axis of the key and the depth of key insertion along its X axis. This embodiment utilizes that program as shown in FIG. 5 for storing a key set of sample signals indicative of the key surface amplitude at a sequence of points along the key surface. The sampling of the signals at each point along the coded key surface is taken in response to an incremental movement of the key along its X axis as indicated by the output of the photosensor 74; this first embodiment is known as the "X-Y" variation. A second embodiment or variation herein termed as the "Y" only variation employs a key transducer similar to that shown in FIG. 1, but not requiring the use of its plunger 64 or its photosensor 74 for providing signals indicative of key insertion depth. Rather, key insertion or movement is detected by a single photosensor, i.e., the photosensor 54, which measures the movement of the key follower 42 as it moves to follow the coded key surface being inserted within the transducer housing 12. In particular, the output of the photosensor 54 is sampled to provide the key set of sample signals indicative of the increments and/or decrements in the height of the coded key surface. The number of signals within the key set of increment or decrement signal may be fixed or be a variable number. As a result, the key reading process is independent of key insertion depth or slope of the coded key surface. For example, a key insertion of one-tenth or one-fourth-of-an-inch could produce three "Y" increments. The microprocessor 106 does not store in its code memory "Y" increment values indexed according to "the X" count or position, but rather stores each increment or decrement of the coded key surface in a set, where a "1" represents an increment and a "0" a decrement. For example, a key profile of the increments would be represented as "111".

Figure 6A:
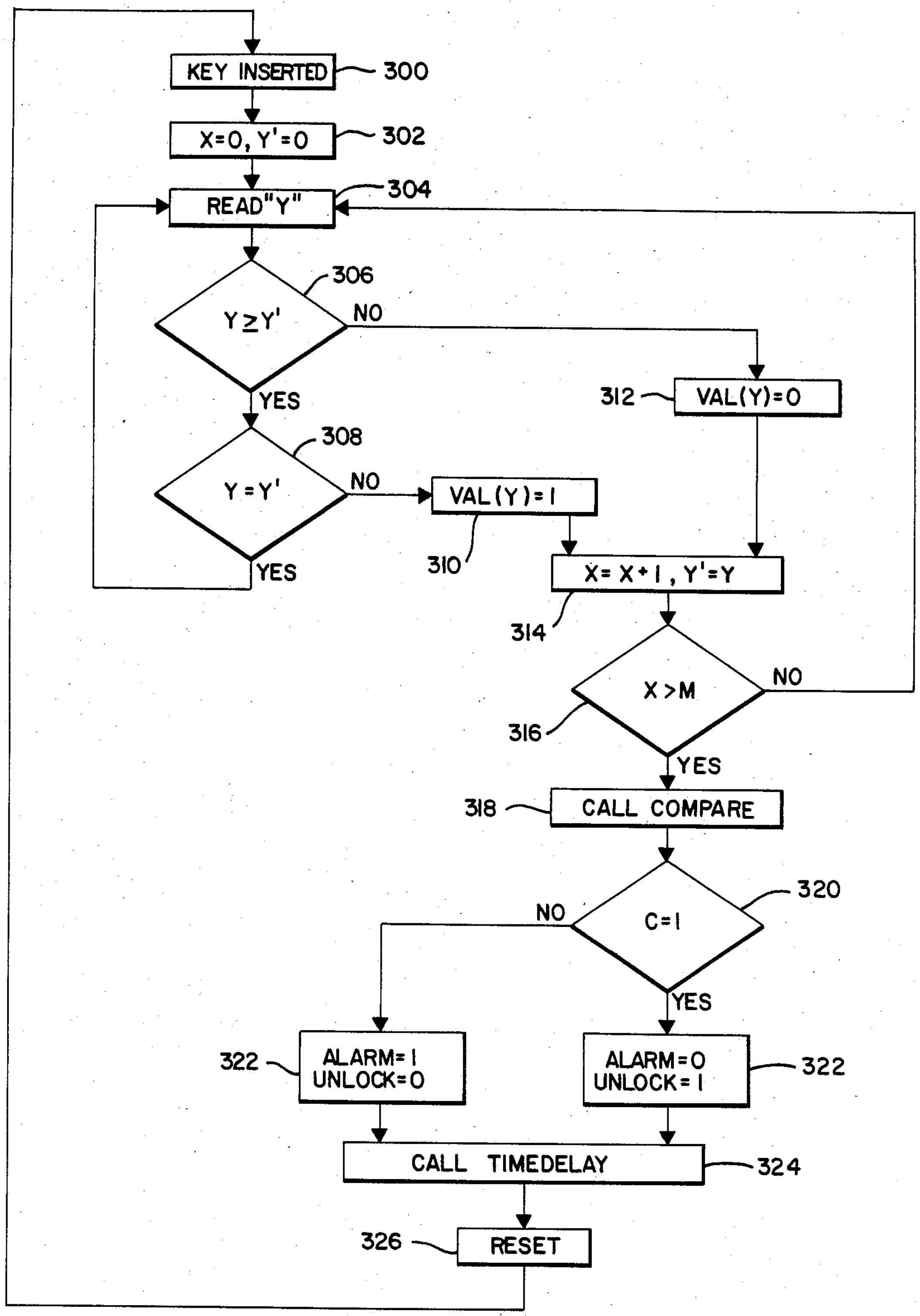
FIGS. 6A, 6B and 6C are respectively low level flow diagrams of programs, as stored within the memory of and executed by the microprocessor of FIG. 4B, for effecting respectively the steps of the "Y" only embodiment of this invention, a first embodiment of a COMPARE subroutine without skew as called by the program illustrated in FIG. 6A, and a second embodiment of the COMPARE subroutine for effecting comparisons with varying degrees of skew, as called by the program of FIG. 6A.

The "Y" only embodiment will now be explained with respect to FIG. 6A, which shows a low level flow diagram thereof, and FIG. 1, which shows the key transducer 10, noting that in the "Y" only embodiment that the plunger 64 and the photosensor 74 for directly measuring key depth insertion may be eliminated. Referring now to FIG. 6A, there is shown a program as stored within the memory of and executed by the microprocessor 106 of FIG. 4B for obtaining a key set of sample signals indicating whether an increment or decrement of the coded key surface has been sampled, each sample being taken upon detection of a change and, in particular, an increment of the amplitude or magnitude of the coded key surface along its Y axis. As will be explained, the obtained key set of sample signals are compared with at least one valid code as stored within a code table or memory of the microprocessor 106. If a match is realized, a release signal is generated and applied to the lock striker assembly 110.

Initially, in step 300, the insertion of the key into the transducer housing 10 is detected in step 300. Thereafter, step 302 initializes the program by clearing the registers that store the 2 bit value Y' indicative of the last reading from the photosensor 54, as well as that value Y indicative of the present 2 bit reading or sample from the photosensor 54. Further, the value of X, which is indicative of the number of Y values that have been sampled, is also erased from its register. Next, step 304 accesses its input ports 5S and 6S to take the next or present value of Y and, in step 306, the present value of Y is compared with the previous value Y' and, if greater or equal thereto, the program moves to step 308, which determines whether the present value of Y is equal to the previous value of Y'. If the values of Y and Y' are equal, indicating that there has been no change in the magnitude of the coded key surface, the program returns to step 304. If the present value of Y is less than the previous value Y', as decided by step 306, step 312 determines not only that there has been a change, but that change is a decrement and sets a "0" into the next location of the input buffer INBUF, as indexed or addressed by the number of previous changes, i.e., increments or decrements. By contrast, if step 308 determines that the present value of Y is not equal to the previous value of Y', indicating that there has been an increase in the amplitude of the coded key surface, step 310 sets a "1" into the input buffer INBUF, indicating that value of Y is an increment. After each of steps 310 and 312, step 314 resets the pointer indexing that storage location in the input buffer INBUF where the next increment or decrement value of Y is to be stored. In particular, the pointer X is incremented by "1", and further, the register storing the previous 2 bit sample of the transducer 74 is updated with the current value of Y.

Thereafter, the program moves to step 316 which determines whether the present index X to the input buffer corresponding to the number of changes that have taken place exceeds the maximum number M of changes as are stored within the input buffer INBUF. M is the number of samples taken to produce the key set of sample signals. If X is less than the maximum value M, the program returns to step 304 and further values of "Y" are taken until an entire set of M increments and/or decrements are stored into the input buffer INBUF. When the input buffer INBUF has been completely filled with "0's" or "1's", as explained above, the program moves to the COMPARE subroutine 318, as will be more fully explained with respect to FIG. 6B. The COMPARE subroutine compares each increment or decrement as stored in the key set of "0's" and "1's" with a set of valid key codes, including at least one valid code as stored within the code memory or table of the microprocessor 106. If a match is obtained, the COMPARE subroutine sets the C FLAG to 1; conversely, if no match is obtained, the C FLAG is set to zero. After returning from the COMPARE subroutine, step 310 examines the C FLAG and, if a "1", step 322 generates a signal to unlock the lock strike assembly 110. If the C FLAG is set to zero, step 322 sets an alarm flag indicating that an improper key has been disposed within the key transducer 10. Thereafter, an appropriate delay is affected by step 324 and, then, step 326 resets the program and, in particular, clears the various registers noted above before returning to step 300 to await the insertion of the next key.

Figure 6B:
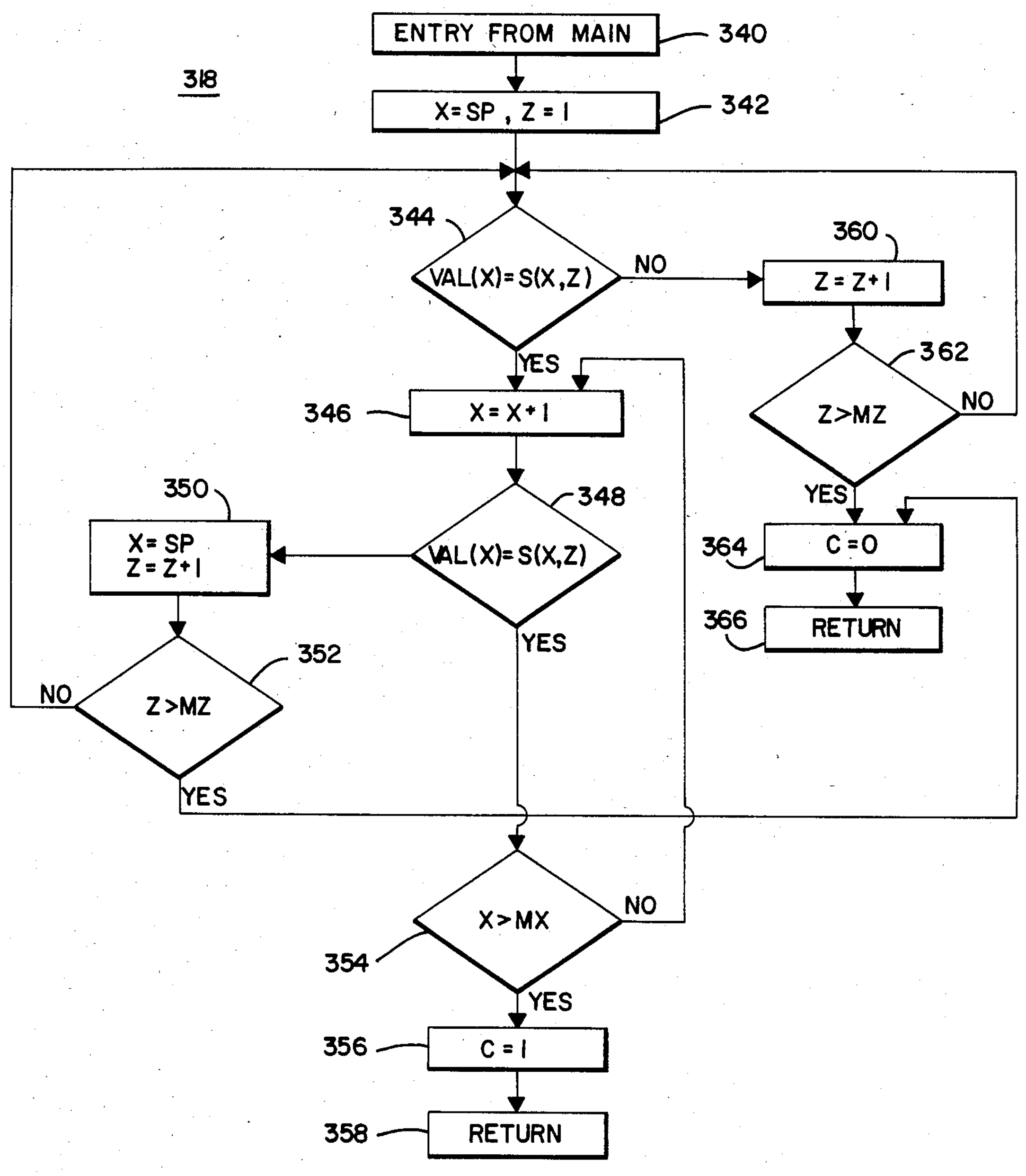

The COMPARE subroutine called by the step 318 of the flow diagram of FIG. 6A, is shown in detail by the flow diagram of FIG. 6B. Generally, the COMPARE subroutine compares each of a given number of samples, whether a "1" indicating an increment or a "0" representing a decrement, as stored within the input buffer INBUF of the microprocessor 106, with a set of valid key codes or manifestations, each code comprised of the given number of "0's" and "1's", as stored within the code memory or table of the microprocessor 106. If each bit of the buffer INBUF corresponds with a corresponding bit of one of the valid codes stored within the code memory, a match is realized, indicating that a valid key has been inserted within the key transducer 10 and a "1" is inserted within the C FLAG register. If no match is achieved between the sequence of bits within the input buffer INBUF and the signals of the corresponding valid codes, a "0" is disposed within the C FLAG register.

The "Y" only variation program calls the COMPARE subroutine, entering it a step 340. In step 342, the registers storing values of Z and X are initialized, i.e., the value of X is set to the starting point "SP" and the value of Z is set equal to "1". The code memory or table is a memory array having a first dimension of X storage locations corresponding to the given number of signals within a valid code or manifestation and a second dimension Z corresponding to the number of valid key codes. The starting point SP identifies a starting address within the code memory for the first bit or signal of the first valid key code. Next, in step 344, a comparison is made between that bit of the input buffer INBUF as indexed by the pointer value X, corresponding to the number of changes previously sensed, with a corresponding signal within the two-dimensional array of the code memory as addressed by the values of X and Z. As will be explained, the value of X is incremented upon the taking of each sample to permit the addressing of corresponding values within the buffer INBUF and the code table. The value Z corresponds to the particular key code being addressed, therebeing a maximum number MZ of valid key codes.

If no match is realized, as decided by step 344, the COMPARE subroutine moves to step 360, wherein the value of Z is incremented to permit a comparison with the next valid code. Thereafter, step 362 determines whether the incremented value of Z exceeds that maximum value MZ thereof and, if not, the COMPARE subroutine returns to step 344, whereby the first bit, as stored within the buffer INBUF is compared with a first bit of the next valid code. If step 362 determines that the value of Z is greater than the value of MZ, indicating that the present set of "0's" and "1's" stored in the buffer INBUF does not match any of the valid codes, the COMPARE subroutine moves to step 364, which sets a zero value into the C FLAG register. Thereafter, the compare subroutine moves to step 366, which effects a return to step 320 of the program, as shown in FIG. 6A.

If a match is determined between the first bit stored within the input buffer INBUF, as decided by step 344, the COMPARE subroutine moves to step 346 which increments the value of X, thereby addressing the next location within the buffer INBUF and the code memory. Thereafter, step 348 compares the newly addressed value within the buffer INBUF with a corresponding value of one of the valid key codes. If a further match is made, step 354 determines whether the value of X is greater than the maximum number MX of samples being taken and, if not, the COMPARE subroutine returns to step 346. In this manner, each of the bits as stored within the buffer INBUF, is sequentially compared with a corresponding bit within the two-dimensional array S(X,Z) of the code memory. If a match of each of the MX bits within the buffer INBUF has been made with corresponding values of a valid key code stored in the code memory, as decided by step 354, step 356 sets a "1" into the C FLAG register, before moving to step 358 which effects a return to step 320 of the main program, as shown in FIG. 6A.

However, if step 348 senses a failure to make a match between a value of the buffer INBUF and a corresponding value of the code memory, the COMPARE subroutine moves to step 350, which resets the addressing value of X to the starting point SP and increments the value of Z by "1". Next, step 352 determines whether the addressing value Z exceeds its maximum value MZ and, if yes, step 364 sets a "0" into the C FLAG register, indicating that the inserted key has failed to match any of the valid key codes. Thereafter, step 366 effects a return to step 320 of the main program, as shown in FIG. 6A. On the other hand, if step 352 indicates that the maximum value or number of Z has not been exceeded, indicating that there are further valid codes to compare the key set of sample signals with, the COMPARE subroutine returns to step 344, to initiate a new sequence of comparisons.

The "Y" only variation program for storing values indicative of the amplitude of the key surface along its Y axis upon detection of a change of key topography is shown by the high level flow diagram of FIGS. 6A and 6B. An illustrative example of the instruction listing for the "Y" only variation program, as would be stored in the RAM of the microprocessor 106, is presented below:

```
                    ;TITLE - SAMPLE CODE FOR MECHANICAL ANALOG KEY READER (MAKER) 26AUG1983
                    ;
                    ;       NATIONAL MICRO PRODUCTS, INC., RICHMOND, VIRGINIA 23236
                    ;
                    ;       MODE = 'Y' ONLY
                    ;
0038                INPORT  EQU     38H     ;INPUT PORT FOR KEY POSITION AND PROFILE VALUE
0039                OUTPRT  EQU     39H     ;OUTPUT PORT FOR STRIKE CONTROL AND ALARM ACTUATION
000C                MAXPOS  EQU     12      ;NUMBER OF INCREMENTS IN SINGLE KEY CODE
0006                NBYTES  EQU     6       ;NUMBER OF BYTES REQUIRED TO HOLD A SINGLE KEY CODE
000C                YMASK   EQU     0CH     ;Y-DIRECTION MASK (PROFILE DATA FROM INPORT)
0001                STRIKE  EQU     1H      ;STRIKE MASK (DATA TO OUTPRT)
0002                ALARM   EQU     2H      ;ALARM MASK (DATA TO OUTPRT)
0003                NUMCOD  EQU     3       ;NUMBER OF LEGAL CODES
                    ;
                    ;***************************************************************
                    ;
0000'               INIT:
0000'   AF                  XRA     A       ;INITIALIZE DATA VALUES
0001'   32 1009'            STA     YCURNT
0004'   32 100A'            STA     YLAST
0007'   32 100B'            STA     YPOS
000A'   32 100C'            STA     XPOS
000D'   21 1000'            LXI     H,INBUF ;INITIALIZE INPUT DATA BUFFER
0010'   06 06               MVI     B,NBYTES
0012'               INIT1:
0012'   05                  DCR     B
0013'   FA 001B'            JM      INIT2
0016'   77                  NOV     M,A
0017'   23                  INX     H
0018'   C3 0012'            JMP     INIT1
001B'               INIT2:
                    ;
                    ;***************************************************************
                    ;
                    ;       THIS IS THE MAIN ROUTINE TO PROCESS KEY POSITION CODES.
                    ;
001B'               READKEY:
001B'   DB 38               IN      INPORT  ;READ CURRENT KEY PROFILE VALUE
001D'   E6 0C               ANT     YMASK   ;ISOLATE AND SAVE KEY PROFILE VALUE
001F'   0F                  RRC
0020'   0F                  RRC
0021'   32 1009'            STA     YCURNT
0024'   3A 100A'            LDA     YLAST   ;CASE - PROCESS CHANGE IN PROFILE VALUE
0027'   47                  MOV     B,A
0028'   3A 1009'            LDA     YCURNT
002B'   B7                  ORA     A
002C'   CA 0074'            JZ      HOME            ;CASE 1- KEY WITHDRAWN
002F'   B8                  CMP     B
0030'   CA 0081'            JZ      NOCHG           ;CASE 2- NO CHANGE
```

```
0033'   D2 003E'            JNC     INCR            ;CASE 3- PROFILE INCREASE
0036'   FE 01               CPI     1
0038'   C2 0048'            JNZ     DECR            ;CASE 4- PROFILE DECREASE
003B'   C3 003E'            JMP     INCR            ;CASE 3- PROFILE INCREASE
                    ;
003E'               INCR:
003E'   3A 100B'            LDA     YPOS    ;INCREMENT ABSOLUTE VALUE OF PROFILE
0041'   3C                  INR     A
0042'   32 100B'            STA     YPOS
0045'   C3 004F'            JMP     NXTPOS
                    ;
0048'               DECR:
0048'   3A 100B'            LDA     YPOS    ;DECREMENT ABSOLUTE VALUE OF PROFILE
004B'   3D                  DCR     A
004C'   32 100B'            STA     YPOS
                    ;
004F'               NXTPOS:
004F'   3A 100C'            LDA     XPOS    ;UPDATE RELATIVE POSITION FROM 'HOME'
0052'   3C                  INR     A
0053'   32 100C'            STA     XPOS
0056'   CD 00C6'            CALL    CODE    ;ENTER PROFILE VALUE IN BUFFER
0059'   3A 100C'            LDA     XPOS    ;IF ENTIRE KEY PROFILE NOT ENTERED
005C'   FE 0C               CPI     MAXPOS
005E'   C2 0081'            JNZ     EXIT            ;THEN THIS PASS COMPLETE, EXIT
0061'   CD 008A'            CALL    COMPARE         ;ELSE CHECK FOR MATCH WITH STORED CODES
0064'   B7                  ORA     A               ;IF MATCH (A=0)
0065'   C2 006E'            JNZ     ERR
0068'   CD 0100'            CALL    UNLOCK                  ;THEN RELEASE STRIKE TO OPEN DOOR
006B'   C3 0081'            JMP     EXIT
                    ;
006E'               ERR:
006E'   CD 0105'            CALL    ERROR   ;PROCESS INVALID ENTRY
0071'   C3 0081'            JMP     EXIT
                    ;
0074'               HOME:
0074'   AF                  XRA     A       ;SETUP FOR NEXT SEQUENCE
0075'   32 100B'            STA     YPOS
0078'   32 1009'            STA     YCURNT
007B'   32 100A'            STA     YLAST
007E'   32 100C'            STA     XPOS
                    ;
0081'               NOCHG:
0081'               EXIT:
0081'   3A 1009'            LDA     YCURNT  ;UPDATE 'Y' VALUES FOR NEXT INCREMENT
0084'   32 100A'            STA     YLAST
0037'   C3 001B'            JMP     READKEY ;REPEAT PROCESS FROM START
                    ;
                    ;***************************************************************
                    ;
                    ;       THIS CODE COMPARES AN ENTERED CODE AGAINST A LIST OF LEGAL
                    ;       CODES AND RETURNS A FLAG TO INDICATE THE RESULT:
                    ;               CODE MATCH    - A=0
                    ;               NO CODE MATCH - A=FF
                    ;
008A'               COMPARE:
008A'   21 1000'            LXI     H,INBUF ;SETUP POINTERS/COUNTERS
008D'   22 1006'            SHLD    SRCPTR
```

```
0090'  21 010A'              LXI    H,CODTBL
0093'  06 03                 MVI    B,NUMCOD
0095'             SRCH1:
0095'  05                    DCR    B          ;IF COMPLETE
0096'  FA 00C3'              JM     SRCH5      ;THIS EXIT, NO MATCH
0099'  AF                    XRA    A                      ;ELSE  CHECK NEXT POSITION
009A'  32 1008'              STA    CMPFLG
009D'  0E 06                 MVI    C,NBYTES
009F'  EB                    XCHG
00A0'  2A 1006'              LHLD   SRCPTR
00A3'  EB                    XCHG
00A4'             SRCH2:
00A4'  0D                    DCR    C          ;IF THIS POSITION CHECKED
00A5'  FA 00B7'              JM     SRCH4                  ;THEN SETUP FOR NEXT
00A8'  1A                    LDAX   D                      ;ELSE CHECK NEXT CHAR
00A9'  BE                    CMP    M
00AA'  CA 00B2'              JZ     SRCH3                  ;IF NOT MATCH
00AD'  3E 01                 MVI    A,1                              ;THEN SET COMPARE FLAG
00AF'  32 1008'              STA    CMPFLG
00B2'             SRCH3:
00B2'  23                    INX    H                                ;ELSE KEEP GOING
00B3'  13                    INX    D
00B4'  C3 00A4'              JMP    SRCH2
00B7'             SRCH4:
00B7'  3A 1008'              LDA    CMPFLG     ;IF NO COMPARE ON THIS PASS
00BA'  FE 01                 CPI    1
00BC'  CA 0095'              JZ     SRCH1                  ;THEN DO ANOTHER PASS
00BF'  AF                    XRA    A                      ;ELSE SET A=FOUND
00C0'  C3 00C5'              JMP    SRCH6
00C3'             SRCH5:
00C3'  3E FF                 MVI    A,0FFH     ;SET A=NOT FOUND
00C5'             SRCH6:
00C5'  C9                    RET
                  ;
                  ;*****************************************************************
                  ;          THIS CODE MERGES A VALUE INTO THE INPUT CODE BUFFER.
                  ;
00C6'             CODE:
00C6'  3A 100C'              LDA    XPOS       ;CALCULATE OFFSET
00C9'  CD 00E7'              CALL   DIVIDE
00CC'  59                    MOV    E,C
00CD'  16 00                 MVI    D,0
00CF'  21 1000'              LXI    H,INBUF
00D2'  19                    DAD    D                      ;WORD OFFSET IN HL
00D3'  B7                    ORA    A          ;IF REMAINDER IS ZERO
00D4'  C2 00E1'              JNZ    CODE1
00D7'  3A 100B'              LDA    YPOS                   ;THEN ADJUST POSITION TO UPPER NIBBLE
00DA'  0F                    RRC
00DB'  0F                    RRC
00DC'  0F                    RRC
00DD'  0F                    RRC
00DE'  C3 00E4'              JMP    CODE2
00E1'             CODE1:
00E1'  3A 100B'              LDA    YPOS                   ;ELSE LEAVE AS IS
00E4'             CODE2:
00E4'  B6                    ORA    M          ;MERGE INTO BUFFER VLAUE
00E5'  77                    MOV    M,A
```

```
00E6'   C9                      RET
                        ;
                        ;**************************************************************
                        ;
                        ; UNSIGNED DIVIDE 4-BIT
                        ;     INPUTS:   A(INTEGER)
                        ;     OUTPUTS:  B(UNITS),C(TWO'S)
                        ;
00E7'                   DIVIDE:
00E7'   0E 00                   MVI     C,0         ;INIT TWO'S VALUE
00E9'   06 06                   MVI     B,6         ;INIT LOOP COUNTER
00EB'                   DIV10:
00EB'   05                      DCR     B           ;IF LOOP COUNT EXPIRED
00EC'   FA 00FC'                JM      DIV20               ;THEN CLEAR VALUE (TOO BIG)
00EF'   FE 02                   CPI     2                   ;ELSE IF VALUE NOW <2
00F1'   DA 00FE'                JC      DIV30               ;THEN DONE
00F4'   0C                      INR     C                           ;ELSE UPDATE EIGHT'S
00F5'   37                      STC
00F6'   3F                      CMC
00F7'   DE 02                   SBI     2                   ;...AND REDUCE BY 2 MORE
00F9'   C3 00EB'                JMP     DIV10
00FC'                   DIV20:
00FC'   AF                      XRA     A           ;ERROR RETURN
00FD'   4F                      MOV     C,A
00FE'                   DIV30:
00FE'   47                      MOV     B,A         ;MOVE REMAINDER (UNITS)
00FF'   C9                      RET
                        ;
                        ;**************************************************************
                        ;
                        ;       THIS CODE UNLOCKS THE STRIKE
                        ;
0100'                   UNLOCK:
0100'   3E 01                   MVI     A,STRIKE            ;ACTIVATE THE STRIKE
0102'   D3 39                   OUT     OUTPRT
0104'   C9                      RET
                        ;
                        ;**************************************************************
                        ;
                        ;       THIS CODE ACTIVATES AN ALARM
                        ;
0105'                   ERROR:
0105'   3E 02                   MVI     A,ALARM   ;ACTIVATE EXTERNAL ALARM
0107'   D3 39                   OUT     OUTPRT
0109'   C9                      RET
                        ;
                        ;**************************************************************
                        ;
010A'   44 A5 4E AD CODTBL:     DB      44H,0A5H,4EH,0ADH,0A9H,4CH  ;LEGAL CODES TABLE
010E'   A9 4C
0110'   52 4F B7 B7             DB      52H,4FH,0B7H,0B7H,0AFH,57H
0114'   AF 57
0116'   49 54 A7 AC             DB      49H,54H,0A7H,0ACH,45H,0B2H
011A'   45 B2
                        ;
                        ;**************************************************************
                        ;
```

```
                ORG     1000H        ;RAM COMMON AREA
1000'   INBUF   EQU     $            ;CODE INPUT ASSEMBLY BUFFER
1006'   SRCPTR  EQU     INBUF+NBYTES ;SEARCH ROUTINE POINTER
1008'   CMPFLG  EQU     SRCPTR+2     ;SEARCH ROUTINE COMPARE FLAG
1009'   YCURNT  EQU     CMPFLG+1     ;CURRENT VALUE OF 'Y' (KEY PROFILE CHANGE)
100A'   YLAST   EQU     YCURNT+1     ;LAST VALUE OF 'Y'
100B'   YPOS    EQU     YLAST+1      ;CURRENT ABSOLUTE VALUE OF 'Y'
100C'   XPOS    EQU     YPOS+1       ;CURRENT VALUE OF KEY 'X' POSITION
        ;
                END
Symbols:
ALARM   0002    CMPFLG  1008'   CODE    00C6'   CODE1   00E1'
CODE2   00E4'   CODTBL  010A'   COMPAR  008A'   DECR    0048'
DIV10   00EB'   DIV20   00FC'   DIV30   00FE'   DIVIDE  00E7'
ERR     006E'   ERROR   0105'   EXIT    0081'   HOME    0074'
INBUF   1000'   INCR    003E'   INIT    0000'   INIT1   0012'
INIT2   001B'   INPORT  0038    MAXPOS  000C    NBYTES  0006
NOCHG   0081'   NUMCOD  0003    NXTPOS  004F'   OUTPRT  0039
READKE  001B'   SRCH1   0095'   SRCH2   00A4'   SRCH3   00B2'
SRCH4   00B7'   SRCH5   00C3'   SRCH6   00C5'   SRCPTR  1006'
STRIKE  0001    UNLOCK  0100'   XPOS    100C'   YCURNT  1009'
YLAST   100A'   YMASK   000C    YPOS    100B'
No Fatal error(s)
```

A brief description of the instructions as set out above will be provided, particularly identifying the programmed instructions by the 4 digit line number appearing at the right hand side of the "Y" only variation program. It is noted that many of the subroutines of the "Y" only variation listing are similar to those subroutines of the "X-Y" variation listing as described above. At lines 0038 to 0003, the neumonics, as used throughout the "Y" only variation listing as set out above, are defined. It is noted that the number of increments of the key is arbitrarily set at 12 and is defined, in this listing, as MAXPOS. The neumonics used in the "Y" only variation listing are similar to those employed in the "X-Y" variation listing. In the INIT subroutine, the YCURNT, YLAST, YPOS and XPOS registers are cleared. A pseudo value of X is stored in the XPOS register that is incremented upon detection of a change in the value of YPOS. Next, the READKEY subroutine examines the 2 bit output signal of the photosensor 54 indicative of the amplitude of the coded key surface along its Y axis. The present 2 bit value of the key amplitude is stored in the YCURNT register, while the last value thereof is stored in the YLAST register. If the value stored in the YCURNT register is zero, indicating that the key is at its HOME position or withdrawn, as determined by the instruction at 002C, the program jumps to the HOME subroutine described below. Next, the instruction at line 002F compares the values of YCURNT and YLAST. If these values are equal indicating that there is no change of the amplitude of the coded key surface, as determined by step 0030, the program moves to the NOCHG subroutine as described below. However, if YCURNT is greater than YLAST, as determined by the instruction at line 0033, the program moves to the INCR subroutine. Next, the value of YCURNT is compared to "1" by the instruction at line 0036. If YCURNT is equal to "1", as determined by the instruction of line 0038, the program moves to the subroutine INCR. By contrast, if the value of YCURNT does not equal zero, the program moves to the DECR subroutine.

The instructions of the INCR subroutine, as set out at lines 003E to 0045, differ significantly from the corresponding instruction of the INCR subroutine of the "X-Y" variation as described above. In particular, INCR subroutine loads the Y count from the YPOS register into the operating register A to be incremented before being returned to the YPOS register. Significantly, the instruction at line 0045 causes the program to jump to the NXTPOS routine, wherein, as will be explained below, the pseudo value X of the key insertion depth as stored in the XPOS register is updated. The pseudo value of the key insertion depth is the mechanism by which a sequence of signals indicative of an amplitude change of the code key surface is stored within the buffer INBUF. In particular, a sequence of "1's" and "1's" are loaded into the buffer INBUF, the "1's" indicating an amplitude increment and the "0's" an amplitude decrement. In this embodiment of the invention, the mechanism for sensing key insertion depth is dispensed with in favor of using a means for determining a change of amplitude of the key surface along the Y axis upon the occurrence of a change of the Y count or key surface amplitude. Thus, upon the occurrence of each change of the key surface amplitude or Y count, the pseudo value X of key insertion depth, as stored in the register XPOS, is updated to thereby initiate the sampling of the next value of the key surface amplitude.

If the READKEY subroutine senses that the current value of the key surface amplitude is less than the last value thereof, the program moves to the DECR subroutine, which decrements the value Y of YPOS before moving to the NXTPOS subroutine, wherein as described above, the pseudo value X of key insertion depth as stored within the XPOS register is updated.

The NXTPOS subroutine, as described above and as set out at lines 004F to 0068, initiates an incrementing of the pseudo value X of key insertion depth, as stored with the XPOS, register upon sensing an increase or decrease in the amplitude of the key surface, as explained above. Thereafter, the instruction at line 0056 places the updated value Y of YPOS into an indexed storage location of the input buffer INBUF, dependent upon the current, pseudo value X of key insertion depth as stored in the XPOS register. Thereafter, the pseudo value X of key insertion depth corresponding to the number of key surface amplitude changes sensed is compared with the maximum value MAXPOS thereof. If a match is realized between the value X of the pseudo key insertion depth and the value of MAXPOS, the COMPARE routine is called. If no match is realized, the program moves to the ERR subroutine. If a match is realized by the COMPARE subroutine, a jump is made to the EXIT subroutine. The ERR, HOME and EXIT subroutines are similar to those described above with respect to the "X-Y" variation listing. The COMPARE subroutine, as illustrated above with respect to the "Y" only variation listing, is identical to that described above with respect to the "X-Y" variation listing. As explained above, the COMPARE subroutine effects an increment-by-increment comparison of those values of the Y count or key insertion amplitude, as measured along the Y axis of the key and as stored in the buffer INBUF, with corresponding signals or values of the valid key codes, as stored in the code memory or table of the microprocessor 106. Further, the COD and DIVIDE subroutines are identical to those described above to effect the same functions.

The UNLOCK subroutine, as shown in line 00FB to 00FF, is called when a match is realized in the COMPARE subroutine to generate an output signal to be applied to the striker assembly 110 to release its striker 112. If a match is not realized, the program moves to the ERR subroutine, whereby an alarm is generated indicating that an unacceptable or invalid key has been disposed within the key transducer 10. Finally, the architecture of the code memory or table containing the three valid codes indicative of acceptable keys is set out at lines 0105 to 0115.

In the "Y" only embodiment described above with respect to FIGS. 6A and 6B, no measurement of the key insertion depth along the X axis of the key is made. Therefore, it is possible to index or store a bit indicative of an increase or decrease into the input buffer INBUF with a degree of skew. To illustrate skew, compare the following sequence or profiles of bits as may be sampled and stored within the buffer INBUF:

| | |
|---|---|
| Correct Reading | "0011101111000011001100" |
| Reading With Positive Skew | "0001110111100001100110" |
| Reading With Negative Skew | "0111011110000110011000" |

Each of the above profiles represent the same series of "1's" and "0's", but due to possible faulty indexing of the sampled signals into the storage locations of the buffer INBUF, the profiles may be shifted negatively or positively. To eliminate false readings as may occur with skewing, the microprocessor 106 may be programmed to compare each profile entered into the buffer INBUF a plurality of times. For example, a first comparison of the profile of values may be effected with 1 bit of positive skew, a second comparison may be made with 0 bits of skew and, a final comparison may be made with 1 bit of negative skew.

Figure 6C:
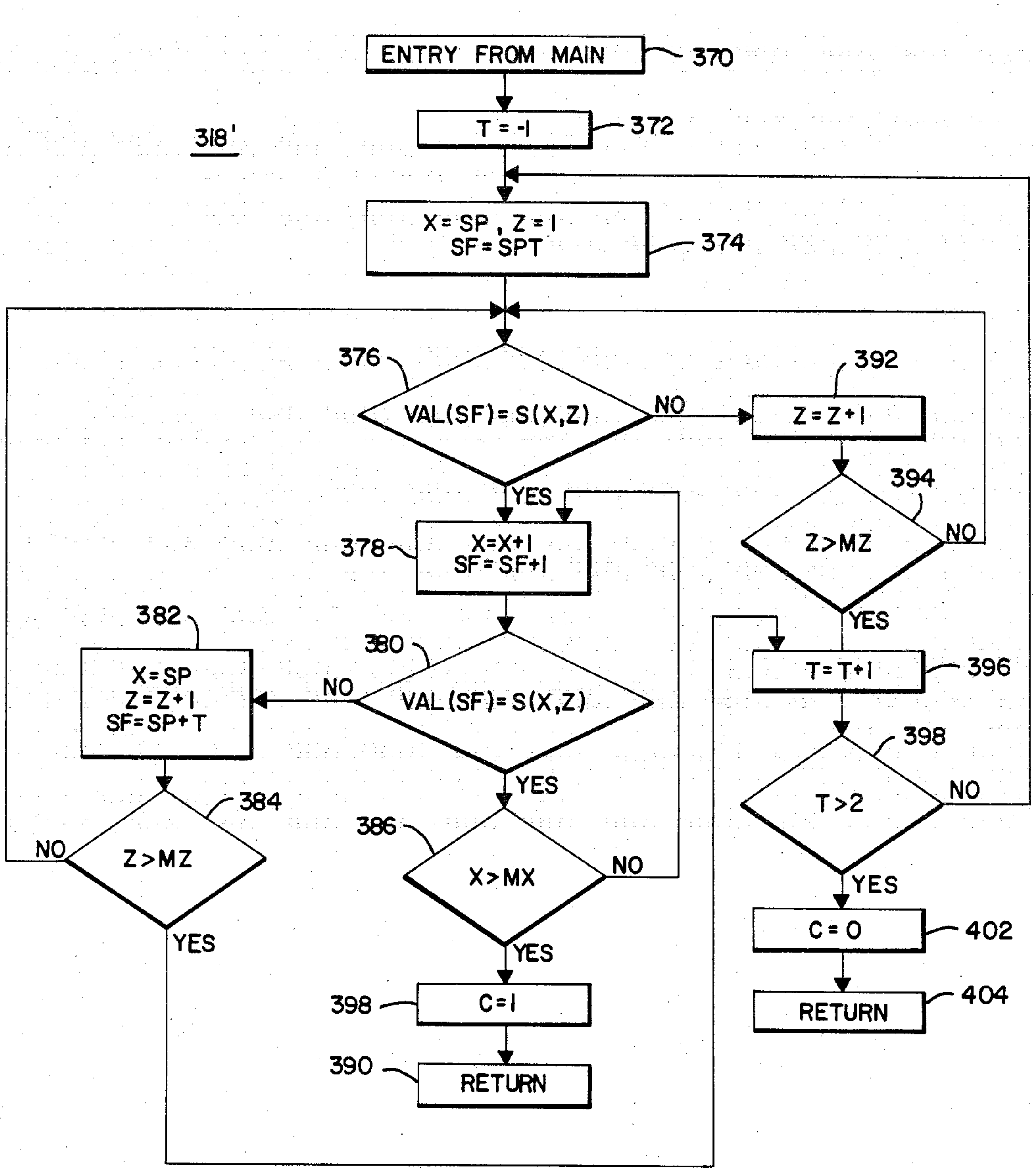

Reference is made to FIG. 6C, which shows an alternative embodiment of the COMPARE subroutine 318' for effecting three comparisons with varying degrees of skew. It is understood that the COMPARE subroutine 318 may be used in conjunction with the main program, as shown and explained above with respect to FIG. 6A and, in particular, is called by step 318 in a manner as explained above. The COMPARE subroutine 318' is entered in step 370. A factor T is used in this subroutine to control the degree of skew, i.e., a factor T of −1 indicates a negative skew of one bit, a factor T of 0 indicates no skew and factor T of +1 indicates a positive skew. In step 372, the factor T is set to a value of −1 indicating that a first set of comparisons is to be made with a negative skew of one bit. Thereafter, step 374 initializes the registers that contain the pointers for addressing corresponding storage locations of the input buffer INBUF and the code memory. In particular, the pointers X and Z, which address the storage locations in the first and second dimensions of the S(X,Z) array of the code memory, are set respectively to the starting point SP and to "1". The skew factor SF is used as that pointer to address a corresponding bit within the input buffer INBUF and is set equal to the value of the starting point plus the T factor. Thus, the bits within the buffer INBUF are shifted or skewed in accordance with the T factor. After initialization, step 376 compares a corresponding bit, as pointed to by the skew factor SF, with a corresponding value within the code memory, as addressed to by the pointers X and Z. If no match is made, as decided by step 376, the COMPARE subroutine 318' moves to step 392, which increments the pointer Z by "1". Thereafter, step 394 determines whether the current value of the pointer Z is greater than its maximum value MZ and, if not, the COMPARE subroutine 318' continues to compare an addressed value within the buffer INBUF with the next valid key code within the code memory until all of the valid key codes have been compared and no match has been realized, as decided by step 394. In that case, step 396 readjusts the degree of skew incrementing the T factor by "1". If the value of T is not greater than "2", as determined by step 398, the comparison process continues by returning to step 374, where the X, Z and SF pointers are reset, before step 376 makes a further comparison of the addressed values within the buffer INBUF and the code memory. If the factor T is greater than "2", indicating that a sequence of comparisons with different degrees of skew has been completed, as decided by step 398, step 402 places a value of "0" into the C FLAG register before returning, in step 404, to the step 320 of the main program, as shown in FIG. 6A. As explained above, a "0" value in the C FLAG register indicates a failure to achieve a match between the profile of bits within the buffer INBUF and the code memory and that the inserted key is invalid.

Returning now to step 376, if a match is made between the bit stored within the buffer INBUF, as indexed by the pointer SF, and the corresponding bit within the code memory, as addressed by the pointers X and Z, the COMPARE subroutine 318' moves to step 378, which updates or increments the pointers X and SF, before moving to step 380, which effects a second comparison of the corresponding values within the buffer INBUF and the code memory. If a further bit match is determined, the COMPARE subroutine 318' moves to step 386, which determines whether the pointer X has exceeded its maximum value MX and, if not, the COMPARE subroutine 318' returns to execute steps 378 and 380, thus, making a sequence of comparisons of corresponding values within the buffer INBUF and the code memory. If the sequence of comparisons is completed, i.e., each bit within the INBUF has been compared successfully with a corresponding bit within the code memory, step 388 sets a value "1" within the C FLAG register indicating that a match has been achieved and a valid key has been inserted within the transducer housing 12. Thereafter, step 390 effects a return to step 320 of the main program, as shown in FIG. 6A.

On the other hand, if step 380 fails to sense a match between the addressed valued within the buffer INBUF and a corresponding value within the code table, the COMPARE subroutine 318′ moves to step 382, wherein the pointers X, Z and SF are reset to SP, Z+1 and SP+T, respectively. Thereafter, step 384 determines whether the pointer Z is greater than its maximum value MZ, indicating that each of the valid codes has been examined. If yes, the subroutine moves to step 396, which readjusts the degree of skew, as explained above. If step 384 determines no, indicating that there are further valid codes or a code to be examined for the present degree of skew, the COMPARE subroutine 318′ returns to step 376, whereby further comparisons are effected.

In this manner, varying degrees of skew are affected by the COMPARE subroutine by adjusting the pointer that indexes a particular value within the input buffer INBUF. If a sequence of comparisons with each of the valid codes fails, the factor T is incremented by "1", wereby a different degree of skew is effected. Thereafter, a further sequence of comparisons is made for the new degreee of skew.

Thus, there has been shown and described a simple mechanism for receiving a convention, mechanical key for generating a sequence of digital signals or counts indicative of a key surface amplitude for each of a sequence of points taken along the length of the key. In a first embodiment of this invention, first and second sensors are employed to provide digital signals indicative of the key surface amplitude, as well as the depth of key insertion, typically along the Y and X axes of the key, respectively. In a second embodiment of this invention, only a single transducer is employed, its digital output indicative of the key surface amplitude. Changes of the key surface amplitude are sensed to sample its value, which values are placed in sequence in a buffer. After a predetermined number of samples of the key surface amplitude equals a predetermined number, indicating that the key has been fully inserted, the derived array of values is compared with one or more valid key codes to determine whether a valid key has been inserted within the mechanism. If a match is realized, a signal is generated to release the lock. On the other hand, if no match is realized, a suitable alarm signal may be generated to provide an alarm manifestation indicating that a nonvalid key has been inserted within the key transducer.

In considering this invention, it should be remembered that the present disclosure is illustrative only and the scope of the invention should be determined solely by the appended claims.

I claim:

1. Key evaluating apparatus for receiving a key having a coded surface extending along a first key axis thereof, the coded surface being of variable amplitude as taken along a second, distinct key axis, said apparatus comprising:

(a) key follower means for abutting and following a discrete portion of the coded surface as the key is moved along the first key axis relatively with respect to said key follower means, for providing a signal proportional to the varying amplitude of the discrete portion; and (b) means for sampling said signal to provide a set of sampled proportional signals taken at a series of the discrete portions along the first key axis.

2. Key evaluating apparatus as claimed in claim 1, wherein there is further included a buffer for receiving said sample signals from said sampling means and for storing said sample signals as a key set corresponding to the sequence of sampling points on the coded key surface.

3. Key evaluating apparatus as claimed in claim 2, wherein there is included memory means for storing at least one valid key code comprising a validating set of electrical signals and means for effecting a comparison of said key set of electrical signals as stored within said buffer and said validating set of electrical signals as stored within said memory means.

4. Key evaluating apparatus as claimed in claim 2, wherein there is included accumulator means for determining the number of sample signals provided generated by said sampling means.

5. Key evaluating apparatus as claimed in claim 4, wherein there is included memory means for storing at least one valid key code comprising a validating set of electrical signals and means responsive to the determination of a predetermined number of sample signals in said accumulator means for effecting a comparison of said key set of sample signals as stored within said buffer and said validating set of electrical signals as stored within said memory means.

6. Key evaluating apparatus as claimed in claim 5, wherein there is included means responsive to said comparison means for determining a match between said key set of sample signals and said validating set of electrical signals to provide a key validation signal.

7. Key evaluating apparatus as claimed in claim 6, wherein said match determining means is responsive to the failure of said comparison means to determine a match between said key set of sample signals and said validating set of electrical signals to provide an invalid key signal.

8. Key evaluating apparatus as claimed in claim 7, wherein there is included locking means operative in a locked state or in an unlocked state and responsive to said key validation signal for operating in said unlocked state.

9. Key evaluating apparatus for receiving a key having a coded surface extending along a first key axis thereof, the coded surface being of variable magnitude as taken along a second, distinct key axis, said apparatus comprising:

(a) key follower means for abutting and following a discrete portion of the coded surface as the key is moved along the first key axis relatively with respect to the key follower means;

(b) transducer means responsive to a displacement of said key follower means for generating a signal proportional to the varying magnitude along the second key axis of the discrete portion; and (c) processing means responsive to the relative movement of the key with respect to said key follower means for sampling said proportional signal to provide a set of said sampled proportional signals taken at a series of the discrete portions along the first key axis.

10. Key evaluating apparatus as claimed in claim 9, wherein said processing means includes key insertion means responsive to the insertion of the key with respect to said key follower means for providing a second electrical signal indicative of key insertion and sampling means responsive to a change of said second electrical signal for taking a sample of said first mentioned electrical signal.

11. Key evaluating apparatus as claimed in claim 10, wherein said sampling means is responsive only to that change of said second electrical signal indicative of increased key insertion for taking said sample of said first mentioned electrical signal.

12. Key evaluating apparatus as claimed in claim 9, wherein said processing means comprises displacer means responsive to the incremental insertion of the key with respect to said key follower means for providing a sequence of second electrical signals, and sampling means responsive to each of said second signals for sampling said proportional signal for providing said set of sample signals indicative of the coded key surface amplitude corresponding to said series of discrete portions on the coded key surface.

13. Key evaluating apparatus for receiving a key having a coded surface extending along a first key axis thereof, the coded surface being of variable amplitude as taken along a second, distinct key axis, said apparatus comprising:

(a) key follower means for abutting and following a discrete portion of the coded surface as the key is moved along the first key axis relatively with respect to said key follower means, for providing a signal proportional to the variable amplitude of the discrete portion; and (b) processor means for determining a change of said proportional signal and, upon occurrence of such determined change, for sampling said signal to provide a set of said sampled proportional signals taken at a series of the discrete portions along the first key axis.

14. Key evaluating apparatus as claimed in claim 13, wherein said processor means provides a first sample signal of a first value indicative of an increase in the amplitude of the coded key surface and providing a second sample signal of a second, different value indicative of a decrease in the amplitude of the coded key surface.

15. Key evaluating apparatus as claimed in claim 14, wherein there is further included a buffer for receiving said first and second sample signals from said processor means and for storing said first and second processor as a key set corresponding to the sequence of sampling points on the coded key surface.

16. Key evaluating apparatus as claimed in claim 15, wherein there is included memory means comprising a Z×X array of storage locations for storing a Z number of valid key codes, each of said valid key codes comprising X electrical signals.

17. Key evaluating apparatus as claimed in claim 16, wherein said buffer comprises X storage locations for storing X sample signals as derived from said processing means.

18. Key evaluating apparatus as claimed in claim 17, wherein there is further included pointer means for sequentially addressing a storage location within said buffer in accordance with an X pointer and for sequentially addressing a storage location within said memory means in accordance with said X and Z pointers, and comparison means for determining a match between signals stored in addressed storage locations of said buffer and said memory means, said comparison means providing a match manifestation indicative of a match between said addressed signals and a no match manifestation indicative of a failure to achieve a match between said addressed signals.

19. Key evaluating apparatus as claimed in claim 18, wherein said pointer means is responsive to said match manifestation to increment said X pointer, whereby said comparison means evaluates the next sample signal of said key within said buffer and the next electrical signal of the same valid key code, and responsive to said no match manifestation to increment said Z pointer, whereby said comparison means compares corresponding signals of said key set of sample signals and the first electrical signal of the next valid key code.

20. Key evaluating apparatus as claimed in claim 19, wherein said comparison means comprises means for determining whether said Z pointer is greater than a maximum value of MZ, indicating a failure to achieve a match between said key set of sample signals and all of said valid key codes of electrical signals and, thereafter, for providing a key invalid signal.

21. Key evaluating apparatus as claimed in claim 15, wherein there is included memory means for storing Z valid key codes, where Z may equal 1, each valid key code comprising a plurality of electrical signals, and comparison means for effecting a comparison of corresponding sample signals of said key set stored within said buffer and electrical signals of said valid key code as stored within said memory means, and means responsive to a failure to achieve a match between said key set of sample signals and all of said Z valid key codes for effecting a skew in the comparison of said sample signals of said key set and said electrical signals of said Z valid key codes.

22. Key evaluating apparatus as claimed in claim 21, wherein said skew effecting means repeatedly effects said skew up to a limit of N skews, and said comparison means comprises means responsive to match failures in excess of N for providing an invalid key signal indicating that an invalid key has been evaluated.

23. Key evaluating apparatus as claimed in claim 21, wherein said memory means comprises an X×Z array of storage locations for storing Z valid key codes, each of said valid key codes comprising X electrical signals, said buffer comprising X storage locations, said comparison means comprising pointer means for addressing corresponding storage locations of said buffer and said memory means, said skewing means being responsive to the failure of said comparison means to achieve a match between said key set of sample signals and all of said valid key codes for effecting a change in said pointer addressing a storage location of said buffer.

24. Apparatus for evaluating a key to determine whether the evaluated key is valid or invalid, the key having a coded key surface extending along a first key axis thereof, the coded key surface being continuous and of a variable magnitude as taken along a second, distinct key axis, said apparatus comprising:

(a) a housing having an opening for receiving a key being inserted along its first axis into said housing;

(b) a key follower having a first portion bearing a pattern of indicia thereon and a second key contact portion, said key follower being movably mounted within said housing for permitting said key contact portion to abut and to follow the coded key surface as the key is inserted into said housing, whereby said key follower is successively displaced in accordance with the magnitude of that portion of the coded key surface abutting said key contact portion; and (c) means fixedly disposed in said housing and responsive to a displacement of said pattern of indicia with respect thereto for generating an electrical signal indicative of the magnitude of the coded key surface.

25. Key evaluating apparatus as claimed in claim 24, wherein said generating means provides said electrical signal as a digital signal indicative of the magnitude of the coded key surface.

26. Key evaluating apparatus as claimed in claim 25, wherein there is included means for sampling said digital signal to provide a set of said digital signals sampled at a series of points of the coded key surface along the first key axis.

27. Key evaluating apparatus as claimed in claim 24, wherein said indicia are comprised of radiation transmissive and nontransmissive indicium.

28. Key evaluating apparatus as claimed in claim 27, wherein said generating means comprises means disposed to emit and direct radiation onto said pattern of indicia, and radiation sensitive means disposed to receive the emitted radiation as transmitted through said radiation transmissive indica of said key follower.

29. Key evaluating apparatus as claimed in claim 28, wherein said radiation sensitive means generates said electrical signal in the form of a 2 bit digital signal indicative of either an increase or decrease of key surface magnitude.

30. Key evaluating apparatus as claimed in claim 29, wherein there is included processing means responsive to said 2 bit digital signal to determine whether there is an increase or decrease of key surface magnitude.

31. Key evaluating apparatus as claimed in claim 30, wherein there is further included a counter for accumulating and storing a count indicative of the key surface magnitude, said processing means responsive to said 2 bit digital signal for incrementing or decrementing said count in accordance respectively with an increase or decrease of key surface magnitude.

32. Apparatus for evaluating a key to determine whether the evaluated key is valid or invalid, the key having a coded key surface extending along a first key axis thereof, the coded key surface being continuous and of a variable magnitude as taken along a second, different key axis, said apparatus comprising:

(a) a housing having an opening for receiving a key being inserted along its first axis into said housing;

(b) a key follower having a key contact portion and being movably mounted within said housing for permitting said key contact portion to abut and to follow the coded key surface as the key is inserted into said housing, said key follower is pivotally mounted about a fixed point in said housing and comprises first and second ends, said first end comprising said key contact portion and said second end bearing a pattern of indicia, and biasing means tending to rotate said key follower member, whereby its key contact portion abuts against the coded key surface of a key inserted into said housing and said key follower is successively displaced in accordance with the magnitude of that portion of the coded key surface abutting said key contact portion; and (c) means responsive to a displacement of said pattern of indicia for generating an electrical signal indicative of the magnitude of the coded key surface.

33. Key evaluating apparatus as claimed in claim 32, wherein said key follower comprises a member pivotally mounted about a fixed point within said housing and biasing means for disposing said key contact portion into contact with the key surface, when the key is disposed within said housing.

34. Key evaluating apparatus as claimed in claim 33, wherein said key follower is mounted within said housing to move along said second axis and biasing means for biasing said key follower along said second axis into contact with the coded key surface, when the key is inserted within said housing.

35. Key evaluating means as claimed in claim 32, wherein there is further included a key displacer movably mounted within said housing for movement along said first axis as the key is inserted into said housing.

36. Key evaluating apparatus as claimed in claim 35, wherein there is further included transducer means responsive to the movement of said key displacer for generating a first electrical signal indicative of key displacer movement.

37. Key evaluating apparatus as claimed in claim 35, wherein said key displacer is disposed in response to key insertion from a first, home position towards a first position along said second axis as the key is inserted into said housing, and there is further included biasing means tending to dispose said key displacer to its home position.

38. Apparatus for evaluating a key to determine whether the evaluated key is valid or invalid, the key having a coded key surface extending along a first key axis thereof, the coded key surface being continuous and of a variable magnitude as taken along a second, distinct key axis, said apparatus comprising:

(a) a housing having an opening for receiving a key being inserted along its first axis into said housing;

(b) a key follower having a key contact portion and being movably mounted within said housing for permitting said key contact portion to abut and to follow the coded key surface as the key is inserted into said housing, whereby said key follower is successively displaced in accordance with the magnitude of that portion of the coded key surface abutting said key contact portion;

(c) first transducer means responsive to a displacement of said key follower for generating a first electrical signal indicative of the magnitude of the coded key surface;

(d) a key displacer movably mounted within said housing for movement along the first axis as the key is inserted into said housing and including a pattern of indicia; and (e) second transducer means fixedly disposed within said housing with respect to said key displacer for sensing the movement of said pattern of indicia for generating a second electrical signal indicative of key displacer movement.

39. Key evaluating apparatus as claimed in claim 38, wherein said pattern of indicia comprises a first indicium indicative that said key displacer is disposed at its home position.

40. Key evaluating apparatus as claimed in claim 39, wherein said second transducer is responsive to said first indicium, when said key follower is disposed at its home position, to generate a home signal.

41. Key evaluating apparatus as claimed in claim 38, wherein said key displacer comprises a second indicium indicative that the key has been fully inserted within said transducer housing, and said second transducer means is responsive to said second indicium, when the key is fully inserted within said transducer housing, to provide a key inserted signal.

42. A key evaluating transducer for receiving a key having an analog surface extending along a first key axis thereof, the analog surface being of variable amplitude as taken along a second, distinct key axis, said transducer comprising:

(a) key follower means having a key contact portion and being suspended to follow the movement of the analog surface as the key is moved along the first axis relatively with respect to said key follower means, for providing a digital signal proportional to the amplitude of that surface portion abutting said key contact portion; and (b) means for sampling said digital signal to provide a set of sampled proportional digital signals corresponding to a series of the discrete surface portions along the first key axis.

43. The key evaluating transducer as claimed in claim 42, wherein said sampling means comprises key displacer means suspended to follow the succession of incremental movements of the key as it is moved along the first axis relatively to said key follower means, and means responsive to each incremental movement of said key displacer means for generating a digital signal indicative of the analog surface corresponding to said portion of said analog surface abutting said key contact portion.

44. The key transducer as claimed in claim 42 wherein said digital generating means comprises means responsive to each movement of said key follower means to provide an electrical signal in the form of a 2 bit digital signal indicative of either an increase or decrease of the magnitude of the coded analog surface.

45. The key transducer as claimed in claim 44, wherein said digital generating means further includes processing means responsive to said 2 bit signal to determine whether there is an increase or decrease of the magnitude of the coded analog surface.

* * * * *